(12) United States Patent
Zhong et al.

(10) Patent No.: US 11,466,813 B2
(45) Date of Patent: Oct. 11, 2022

(54) TOOL CARRIER

(71) Applicant: Globe (Jiangsu) Co., Ltd., Jiangsu (CN)

(72) Inventors: Minglong Zhong, Jiangsu (CN); Doushi Wang, Jiangsu (CN)

(73) Assignee: Globe (Jiangsu) Co., Ltd., Jiangsu (CN)

( * ) Notice: Subject to any disclaimer, the term of this patent is extended or adjusted under 35 U.S.C. 154(b) by 59 days.

(21) Appl. No.: 16/688,202

(22) Filed: Nov. 19, 2019

(65) Prior Publication Data

US 2020/0173605 A1 Jun. 4, 2020

(30) Foreign Application Priority Data

Dec. 3, 2018 (CN) .......................... 201811466227.X

(51) Int. Cl.
*F16M 13/04* (2006.01)
*A45F 3/14* (2006.01)
*A45F 5/00* (2006.01)

(52) U.S. Cl.
CPC .............. *F16M 13/04* (2013.01); *A45F 3/14* (2013.01); *A45F 5/00* (2013.01); *A45F 2003/142* (2013.01); *A45F 2200/0575* (2013.01)

(58) Field of Classification Search
CPC ... F16M 13/04; A45F 3/14; A45F 5/00; A45F 2003/142; A45F 2200/0575
USPC ....................................................... 224/259
See application file for complete search history.

(56) References Cited

U.S. PATENT DOCUMENTS

| | | | | |
|---|---|---|---|---|
| 1,875,274 | A * | 8/1932 | Soule ...................... | F16G 11/02 24/600.9 |
| 5,620,121 | A * | 4/1997 | Watson .................. | F16M 13/04 224/272 |
| 6,158,636 | A * | 12/2000 | Latiolais ................... | A45F 3/14 224/257 |
| 6,247,624 | B1 | 6/2001 | Rundberg | |
| 7,201,355 | B1 * | 4/2007 | Zien ......................... | A01K 5/01 248/301 |
| 8,857,682 | B2 * | 10/2014 | Nakaya ............... | A01D 34/902 224/257 |
| 9,689,126 | B2 * | 6/2017 | Barth ..................... | A01G 20/47 |
| 10,517,376 | B2 * | 12/2019 | Neal .................... | A01D 34/902 |
| 10,905,907 | B1 * | 2/2021 | Dold ..................... | B25G 1/102 |

(Continued)

FOREIGN PATENT DOCUMENTS

EP 1443836 B1 7/2011

*Primary Examiner* — Peter N Helvey
(74) *Attorney, Agent, or Firm* — Rooney IP, LLC

(57) ABSTRACT

A tool carrier used for carry tool includes a harness system, a bearing belt and a guard, the harness system includes two shoulder strap and a waist belt, the bearing belt passes through the guard to be connected with the harness system. The guard has a main board, a sliding structure at a top of the main board and a suspension structure. The sliding structure has a sliding hole for the bearing belt running through, the main board is formed with a main plane, a horizontal projection of the sliding hole and a horizontal projection of the main plane define an angle therebetween, and the angle is an acute angle. When a tool is loaded to the suspension structure of the guard, the guard can slide forwardly and backwardly relative to the bearing belt during working, so that the weight of the tool can be uniformly distributed.

16 Claims, 25 Drawing Sheets

(56) References Cited

U.S. PATENT DOCUMENTS

2005/0067448 A1     3/2005   Rundberg
2010/0270344 A1   10/2010   Mori et al.

* cited by examiner

TOOL CARRIER

CROSS-REFERENCE TO RELATED APPLICATIONS

This application is a US application which claims the priority of CN Application Serial No. 201811466227.X, filed on Dec. 3, 2018, the disclosures of which are hereby incorporated by reference in their entirety.

TECHNICAL FIELD

The present invention relates to a tool carrier, especially relates to a tool carrier for carrying garden tools.

BACKGROUND

Following improvement of people's living standards and enhancement of environmental awareness, people begin to plant green grass and trees in the yard and other places, so more and more garden tools, such as string trimmer and brush cutter, are widely used. However, garden tool usually has a heavy weight, so it is very tired for an operator to hold the tool by hands for a long working time. Therefore, tool carriers which can reduce the work intensity of operators gradually become popular.

The tool carrier generally comprises a strap system and a guard panel, the tool is loaded on the guard panel, the strap system consists of shoulder straps and a waist belt to transfer the weight of the tool to the shoulder and waist of the operator, that can prevent the weight of the tool from focusing on partial areas of the operator and causing uncomfortable. The guard panel is provided with a suspension structure for hanging the tool, and connects to the strap system by a bearing belt. The guard panel can provide a certain buffer function between the operator and the tool, prevent the tool from crashing the operator during work and avoid damages to the operator by the tool. When the tool is hung on the suspension structure and is in working condition, a forward and backward movement of the tool brings a corresponding forward and backward movement of the guard panel. However, the guard panel and the bearing belt of present tool carrier are usually fixedly connected and cannot slide relative to each other, this structure is inconvenient to work. Furthermore, if the operator works on a slope, the tool must hold in an inclined state, and the fixed connection between the guard panel and the bearing belt may cause a great inconvenience to the operator during the entire working process.

SUMMARY OF INVENTION

An object of the present invention is to provide a tool carrier which has a guard slidable along a bearing belt.

According to an aspect of the present invention this object is achieved by a tool carrier, comprising a harness system having at least one shoulder strap, and a waist belt; a guard provided with a main board, a sliding structure at a top of the main board and a suspension structure at a bottom of the main board, the main board formed with a main plane, the sliding structure defining a sliding hole; and a bearing belt passing through the sliding hole of the guard and being connected to the harness system by two opposite ends thereof; wherein a horizontal projection of the sliding hole and a horizontal projection of the main plane define an angle therebetween, the angle is an acute angle.

In an exemplary embodiment, the angle is between 0°-60°.

In an exemplary embodiment, the angle is between 25°-35°.

In an exemplary embodiment, the sliding structure is disposed at an angle with respect to the main plane of the main board.

In an exemplary embodiment, the sliding structure is fixed to the top of the main board, a top of the sliding structure is twisted disposed relative to the main plane to define an angle between the top of the sliding structure and the main plane, the sliding structure has a piece shape, and the sliding hole is defined at the top of the sliding structure.

In an exemplary embodiment, the guard defines an opening on a side surface thereof and an upper through hole on a top surface thereof, the bearing belt passes through both the opening and the upper through hole.

In an exemplary embodiment, the upper through hole is the sliding hole.

In an exemplary embodiment, a cushion pad is disposed on an inner side of the guard facing to operator In an exemplary embodiment, a quick release member is fixed to the guard and makes the suspension structure be able to quickly escape form the guard.

In an exemplary embodiment, the guard and the waist belt are connected by an elastic band.

According to an aspect of the present invention this object is achieved by a tool carrier comprising a harness system having at least one shoulder strap and a waist belt and defining a front to back direction; a guard provided with a sliding hole at a top thereof and a suspension structure for hanging a tool; and a bearing belt passing through the sliding hole of the guard and having two opposite ends being connected to the harness system respectively, the bearing belt forming a bending line as engaging with the sliding hole, the bending line extending along a direction with an acute angle to the front to back direction as observed from a top side.

In an exemplary embodiment, the acute angle is between 0°-60°.

In an exemplary embodiment, the acute angle is between 25°-35°.

In an exemplary embodiment, the harness system has two the shoulder straps, a chest buckle connecting the two shoulder straps on a front side and a backplane connecting the two shoulder straps on a back side, the two opposite ends of the bearing belt is connected to the backplane and the chest buckle, respectively.

In an exemplary embodiment, wherein the guard provided with a main board, a sliding structure is disposed at a top of the main board and defining the sliding hole, the main board is formed with a main plane.

In an exemplary embodiment, wherein a top of the sliding structure defines the sliding hole and is twisted disposed relative to the main plane to define an acute angle between the top of the sliding structure and the main plane.

In an exemplary embodiment, the guard defines an opening on a side surface thereof and an upper through hole on a top surface thereof, the bearing belt passes through both the opening and the upper through hole, and the upper through hole is disposed with an acute angle to the front to back direction.

In an exemplary embodiment, a quick release member is fixed to the main board to make the suspension structure be able to quickly escape form the guard.

BRIEF DESCRIPTION OF DRAWINGS

The invention will now be described, by way of example, with reference to the accompanying drawings, in which.

DESCRIPTION OF EMBODIMENTS

In the following, to make above described objects, features and advantages of the present invention become more apparent, a detailed description of exemplary embodiments of the present invention will be described in below with reference to the accompanying drawings. It should be noted that the left and right sides in the present invention refer to the left and right sides of the operator after the operator wears the tool carrier, the inner refers to the side facing the operator and the outer refers to the side away from the operator.

Figure 1:
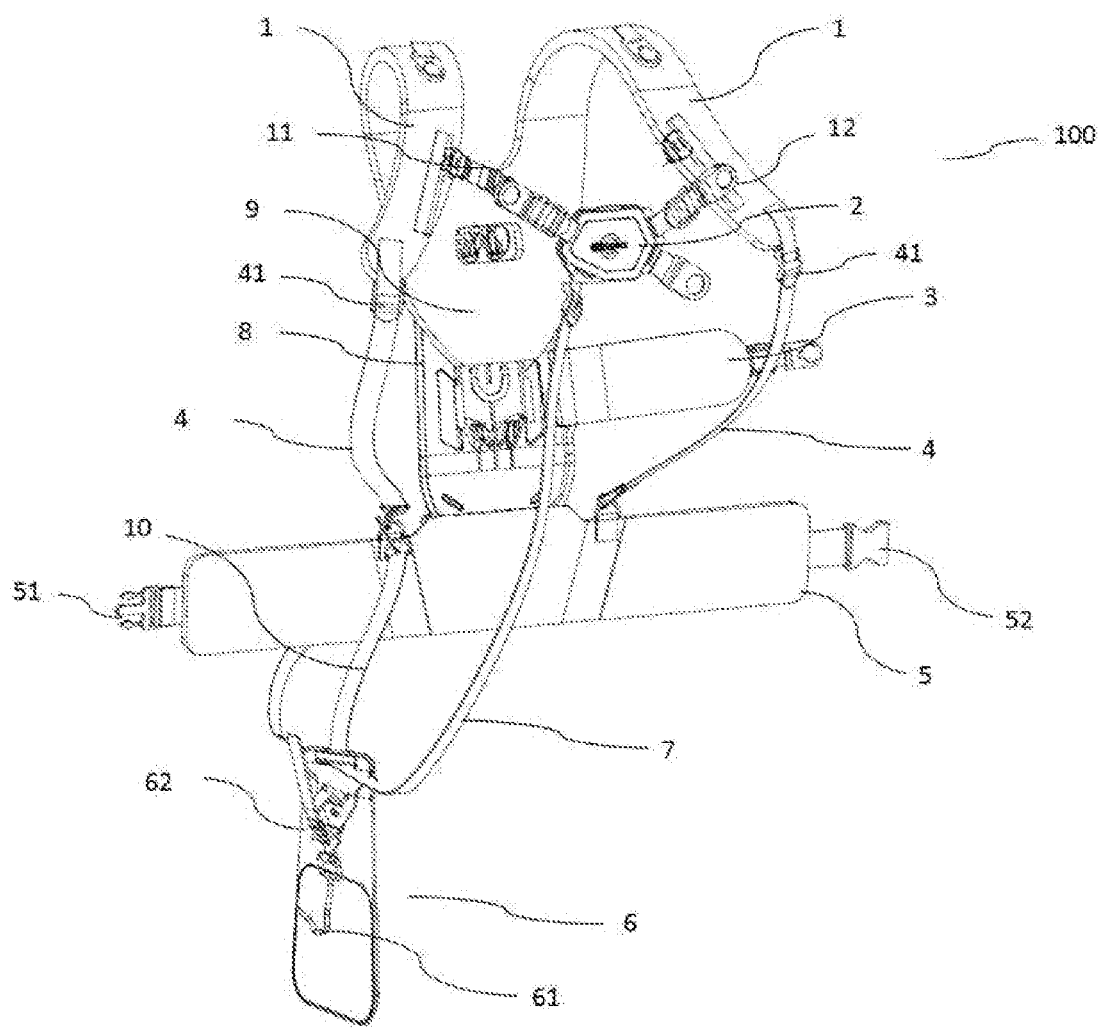
FIG. 1 is an assembled and perspective view of a tool carrier in accordance with one embodiment of the present application.
Figure 2:
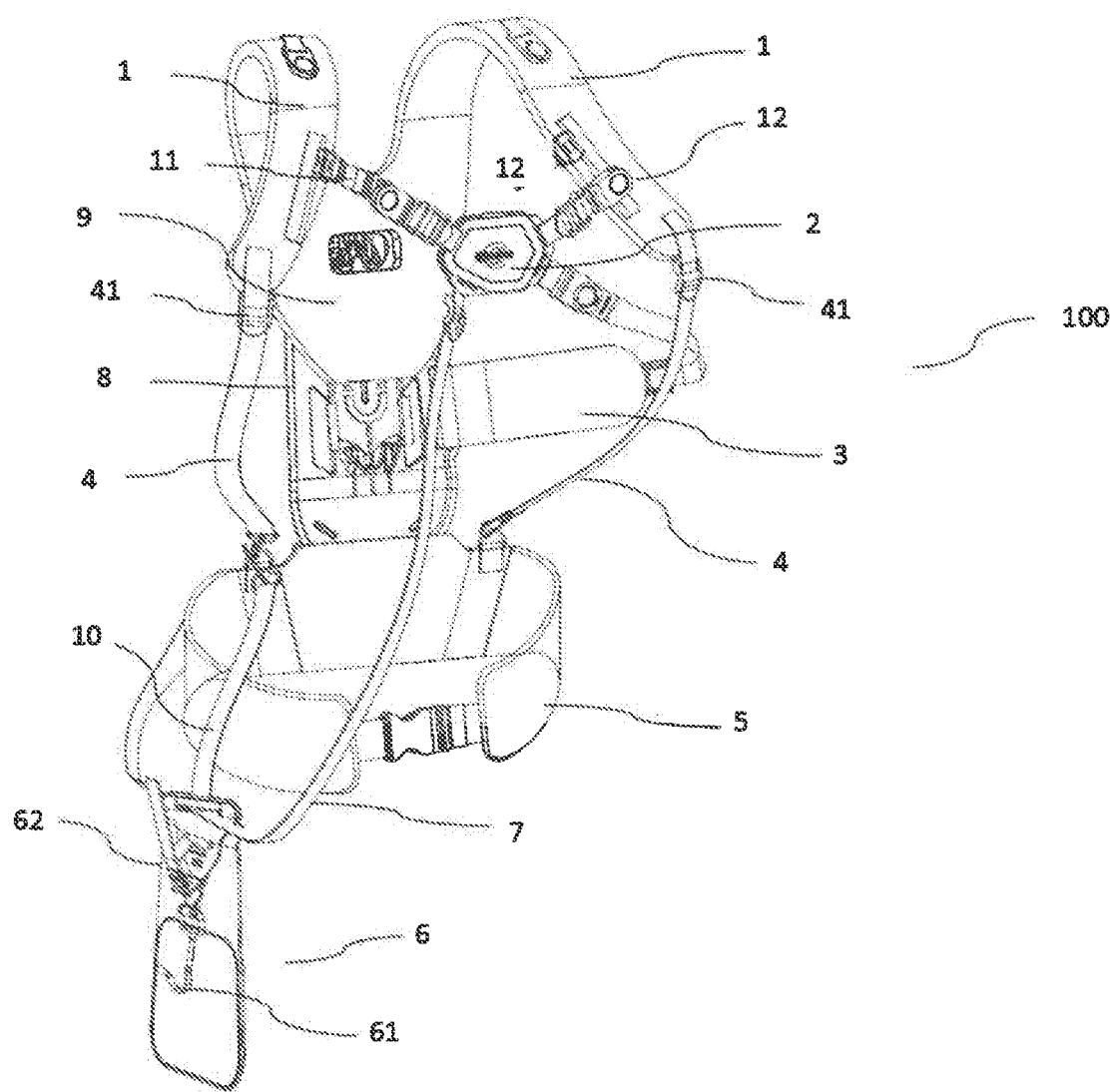
FIG. 2 is another perspective view of the tool carrier, wherein two ends of the waist belt are connected.

A tool carrier 100 in accordance with one embodiment of the present application is wore by operator and used to carry a tool, such as a string trimmer. Referring to FIG. 1 and FIG. 2, the tool carrier 100 includes a harness system, a guard 6 for carrying the tool and a bearing belt 7 connecting between the harness system and the guard 6. The strap system includes: a left and a right shoulder straps 1, a chest buckle 2, a side strap 3, a left and a right connecting strips 4, a left and a right length adjustors 41, and a waist belt 5. FIG. 1 and FIG. 2 both are perspectives view of the tool carrier 100, the difference is that two ends of the waist belt 5 are connected together in FIG. 2. A backplane 8 is connected to the harness system by a pad 9, and further connected to a bearing plane 15 (FIG. 12) on an outer side thereof. The guard 6 is slidably connected to the harness system by the bearing belt 7, and is provided with a suspension structure 61 for hanging the tool, such as a string trimmer, a brush cutter, etc., and a quick release member 62 for quickly releasing the tool hung on the suspension structure 61. The suspension structure 61 may be a hook in present embodiment.

Figure 3:
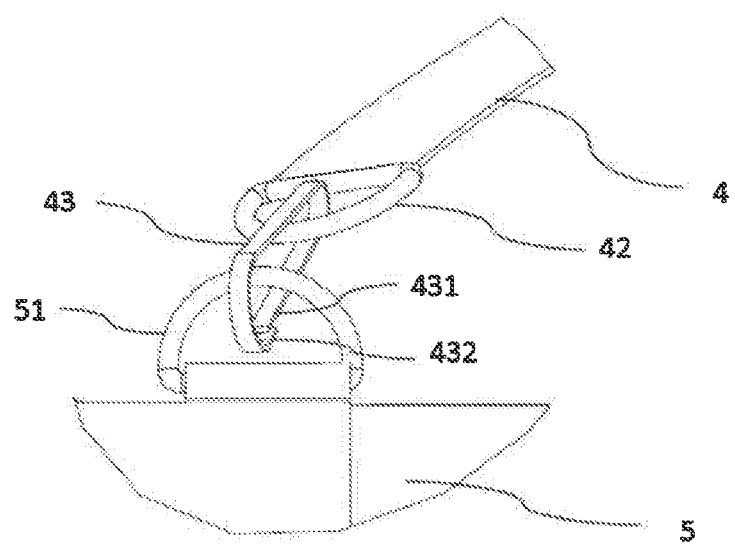
FIG. 3 shows the waist belt connecting with a shoulder strap of the tool carrier.
Figure 4:
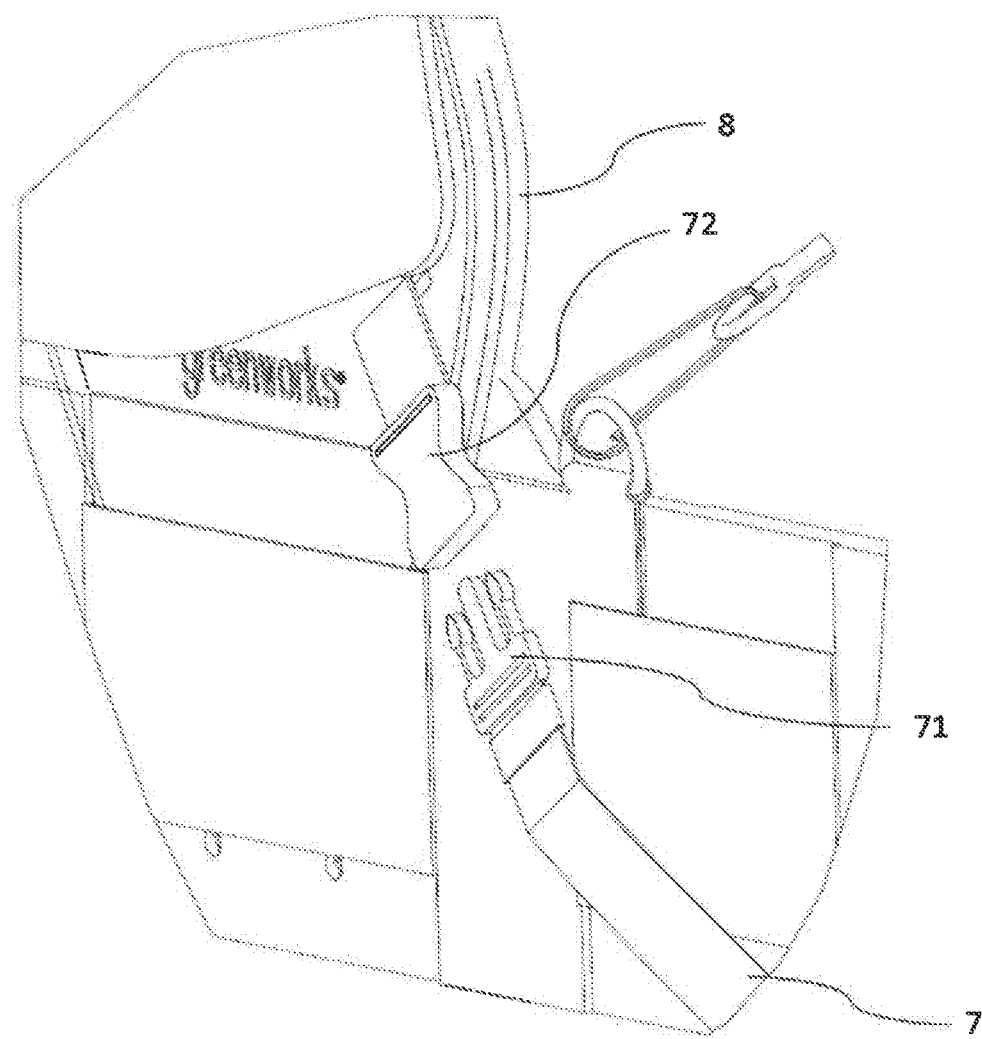
FIG. 4 show a bearing belt of the tool carrier connecting with a guard of the tool carrier.

Referring to FIG. 1 and FIG. 2, in using, the left and the right shoulder straps 1 abut against the shoulders of the operator (not shown), and one end of each of the left and the right shoulder straps 1 is connected to the pad 9 by riveting, stitching, bonding, etc. or by quick-connecting devices in prior arts; and the other end of each of the left and the right shoulder straps 1 are respectively connected to the left and right connecting strips 4 by stitching or quick-connecting devices, preferably by an the left and the right length adjustors 41, respectively. Another ends of the left and right connecting strips 4 are connected with the waist belt 5 in a manner as shown in FIG. 3. The left and the right length adjustors 41 can adjust lengths of a part of the left and the right connecting strips 4 disposed between the waist belt 5 and the left and the right shoulder straps 1.

As shown in FIG. 3, the waist belt 5 is fixed with two first fixing rings 51 by stitching, each of the left and the right connecting strips 4 is correspondingly fixed with a second fixing ring 42 by stitching, and the second fixing ring 42 links with the first fixing ring 51 by an operational ring 43. The operational ring 43 is provided with an elastic portion 431, the elastic portion 431 is deformed to define an opening when being pressed by hand and then the first fixing ring 51 and the second fixing ring 42 can escape from the operational ring 43 through the opening. And when the elastic portion 431 is released and restores to close the opening by a blocking portion 432, the waist belt 5 and the connecting strip 4 are kept together by the operational ring 43.

The left shoulder strap 1 is disposed with a female part 12, and the right shoulder strap 1 is disposed with a male part 11, while the chest buckle 2 has two mating parts on a top thereof, the two mating parts can be quickly coupled with or detached from the male part 11 and the female part 12, respectively, so that the left and the right shoulder straps 1 are easily linked to or removed from the chest buckle 2. The chest buckle 2 is jointed with the bearing belt 7 on a right lower side thereof, and jointed with the side strap 3 on a left lower side by a quick release buckle, and the other end of the side strap 3 is connected to the backplane 8 by a quick detachable member, such as a Velcro.

Referring to FIG. 1, the waist belt 5 is provided with a male connector 51 and a female connector 52 on two opposite ends, the waist belt 5 surrounds the waist of the operator, the male connector 51 inserts into the female connector 52 and latches with the female connector 52, therefor the waist belt 5 is attached to the waist of the operator. It will be appreciated by skilled persons in this field that a length adjustment member can be provided on the waist belt 5 for adjusting a length of the waist belt 5 to suit different operators.

Referring to FIG. 1, an end of the bearing belt 7 is connected to the chest buckle 2, and the other end of the bearing belt 7 passes through the guard 6 and has a male connecting member 71, which engages with a female plug 72 formed on the backplane 8. So that, the bearing belt 7 is connected to the chest buckle 2 and the backplane 8 at two ends thereof. The bearing belt 7 can distribute a weight of the tool to the waist belt 5, and further to the shoulder strap 1 and the side strap 3 by the chest buckle 2, thereby the weight of the tool can be evenly distributed to the whole body of the operator, the weight of tool is avoided to be concentrated on a part of the body of the operator and damage to the health of the operator.

As a preferred embodiment, an elastic band 10 which is made by elastic material is provided between the waist belt 5 and the guard 6, to disperse a part of the weight of the tool hung on the suspension structure 61. Furthermore, the elastic band 10 can be used as a buffer during working due to its elasticity.

Figure 5:
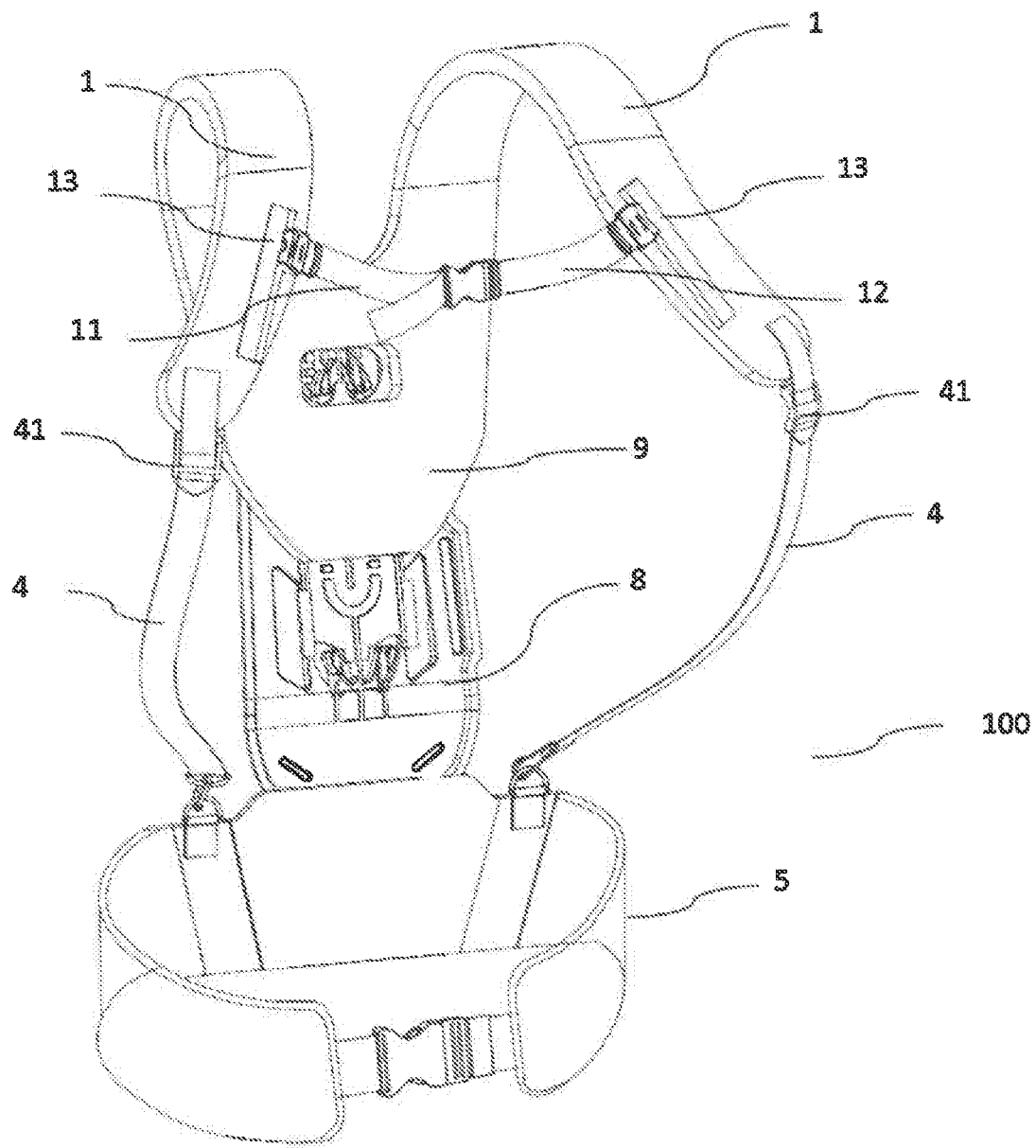
FIG. 5 is a perspective view of the tool carrier without the guard.

As another embodiment, when the backplane 8 is connected to a bearing plane 15 (FIG. 12) to carry a load such as a battery pack, and no tool is needed to hung by the suspension structure 61, then the bearing belt 7, the elastic belt 10, the chest buckle 2 and the side straps 3 can be detached, and the male part 11 and the female part 12 of the left and the right shoulder straps 1 are fastened to each other, as shown in FIG. 5. A guide rail 13 is respectively disposed on each of the left and right shoulder straps 1, the male part 11 and the female part 12 are slidably assembled to the guide rails 13, respectively. Adjust the male part 11 and the female part 12 upwardly and downwardly to suit different operators with different heights.

Figure 6A:
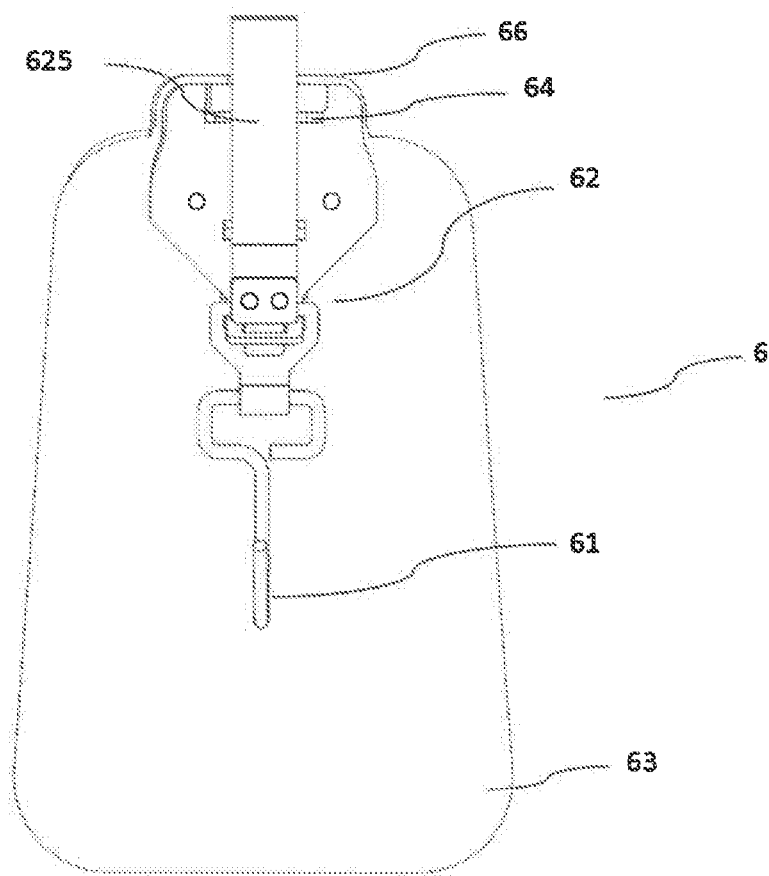
FIG. 6(a) is a front view of the guard in accordance with a first embodiment.
Figure 6B:
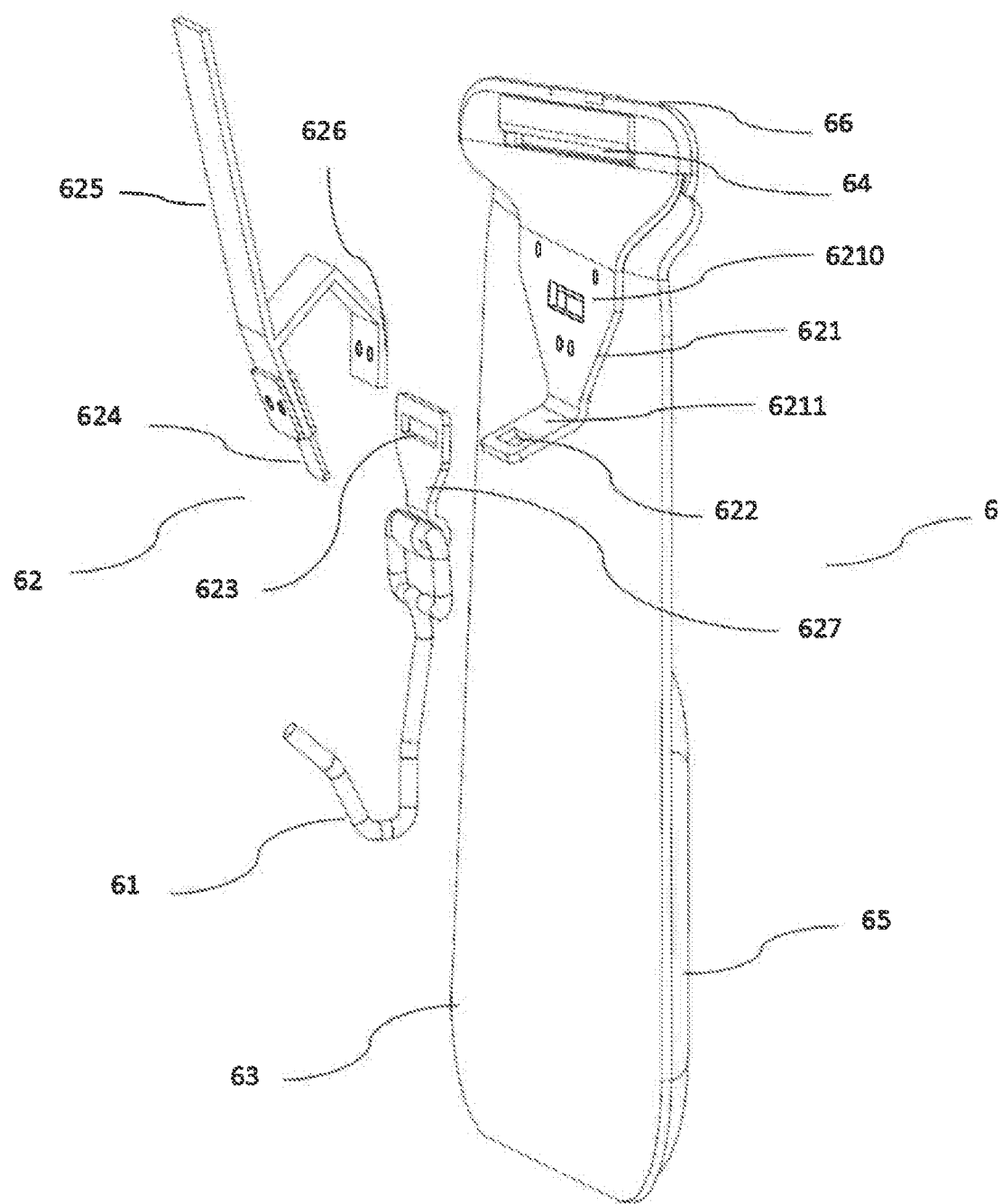
FIG. 6(b) is an exploded view of the guard in accordance with the first embodiment.
Figure 6C:
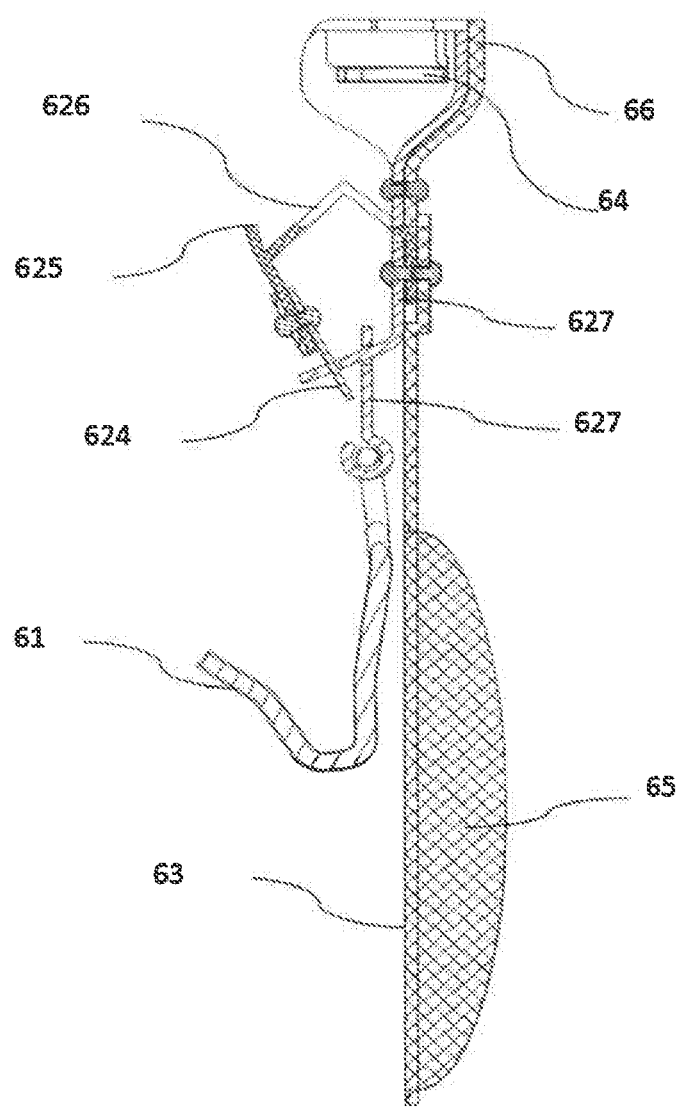
FIG. 6(c) is a sectional view of the guard in accordance with the first embodiment.

Referring to FIGS. 6(a), 6(b), and 6(c), the guard 6 has the suspension structure 61 for hanging the tool, a quick release member 62, a main plate 63, and a cushion pad 65. The main board 63 is made by hard material, such as metal or plastic. The main board 63 has a substantially planar inner side and a substantially planar outer side, the quick release member 62 is fixed to a bottom of the main board 63, the suspension structure 61 is detachably connected to the quick release member 62, and the cushion pad 65 is disposed on the inner side of the main board 63 facing to operator. The cushion pad 65 is filled by soft material, such as a sponge, and covered with another material such as leather. As another embodiment, the cushion pad 65 may be integrally formed by a flexible material and connected to the inner side of the main board 63. The cushion pad 65 can buffer the impact of the tool on the operator during work, and reduce the damage caused by the impact of the tool on the operator.

FIG. 6(b) is an exploded view of the guard 6, wherein the quick release member 62 has a first member 621 fixed to the main plate 63, a second member 627 detachably engaging with the first member 621 and a third member 626 remain the second member 627 to the first member 621. A top of the suspension structure 61 is pivotally assembled to the second member 627.

The first member 621 has an extension 6210 extending substantially along the main plate 63 and an end portion 6211 extending outwardly and downwardly from the extension 6210. Conjoined with FIG. 6(c), the extension 6210 is substantially in a vertical direction, and an angle between the end portion 6211 and the extending portion 6210 is an obtuse angle. An upper portion of the second member 627 substantially extends in a vertical direction and provided with a through hole 623, the end portion 6211 passes through the through hole 623 of the second member 627 to connect the first member 621 with the second member 627. The end portion 6211 defines a stopping hole 622 passing through the through hole 623 to be exposed outside.

The third member 626 is retained to the first member 621 and has a tail portion 625 extending downwardly and assembled with a stopping member 624. The third member 626 is preferably of a flexible material. After the end portion 6211 of the first member 621 passes through the through hole 623 of the second member 627 and expose the stopping hole 622, the stopping member 624 is inserted into the stopping hole 622 to block the first member 621 from escaping from the through hole 623, in another words, the stopping member 624 can prevent the second member 627 with the suspension structure 61 from falling downwardly from the first member 621. When an emergency occurs, the tool need to be unloaded, but cannot be unloaded or can't be loaded in time. At this time, only needs to pull up the tail portion 625 by hand, and the stopping member 624 is pulled out from the stopping hole 622, then the tool, the suspension structure 61 and the second member 627 will fall together under the action of gravity. So that the quick release member 62 facilitates an escape of the operator in emergency situations and improve the safety performance of the entire tool carrier 100.

In the actual working process, the operator may work on a slope or have a front- to back movement. Therefore, the guard 6 slides relative to the bearing belt 7 can increase comfort level for the operator and improve work efficiency. In order to realize the sliding connection between the bearing belt 7 and the guard 6, the guard 6 in a first embodiment is as follows:

A sliding structure 66 is fixed to a top portion of the guard 6 by riveting, welding, etc., and is provided with a sliding hole 64 through which the bearing belt 7 passes. The sliding structure 66 is a metal component or a plastic component, and can be integrally formed with the first member 621 or be assembled to the main board 63 as a separated component. In this embodiment, the sliding structure 66 has a piece-shaped structure, which is not disposed in parallel with a main plane of the main board 63 but twisted relative to the main plane of the main board 63.

Figure 6D:
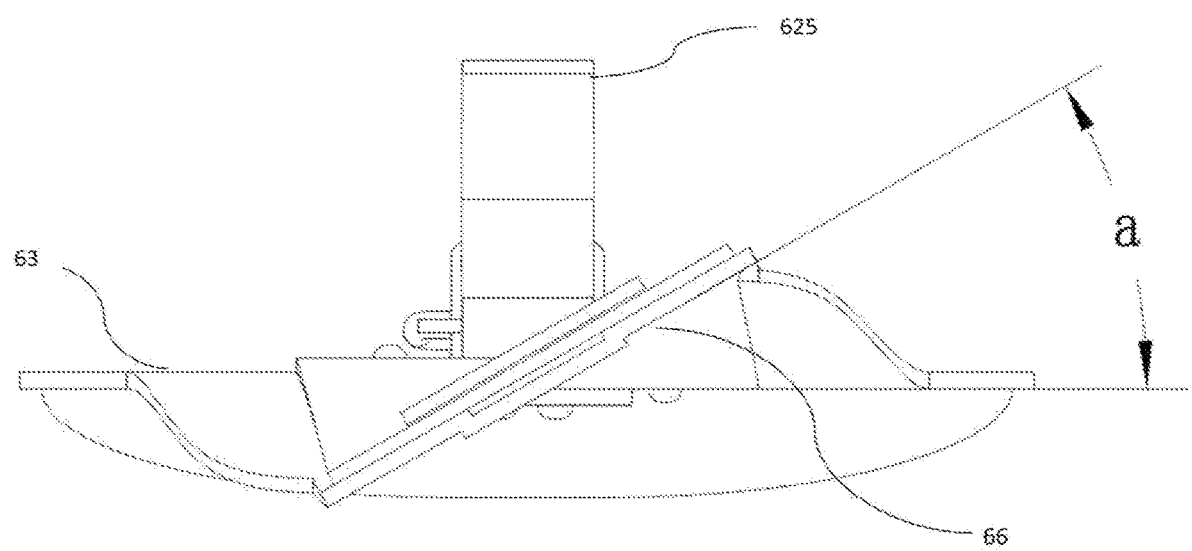
FIG. 6(d) is a top view of the guard in accordance with the first embodiment.

Conjoined with FIG. 6(d), a top of the sliding structure 66 is disposed at an angle a with the main plane of the main board 63, wherein the angle a is an acute angle, which is specifically 0-90°, preferably 0-60°, and more preferably 25°-35°, wherein when the sliding structure 66 is disposed perpendicular to the main board 63, the angle a is about 90°. That is, the above-described angle a is formed between a horizontal projection of the sliding hole 64 and a horizontal projection of the main plane of the main board 63. Actually, the main plane of the main board 63 substantially in the font-to-back direction, so the sliding hole 64 is set at an angle relative to the font-to-back direction. The bearing belt 7 passes through the sliding hole 64 and form a bending line as engaging with the sliding hole 64, the bending line extending along a direction with an acute angle to the front to back direction as observed from a top side. So that the bearing belt 7 can slide along the font-to-back direction. The elastic band 10 connects the top of the sliding structure 66 to the guard 6 to disperse the weight of the tool hung on the suspension structure 61. In order to increase the aesthetics of the overall structure of the guard 6 and improve the safety performance, an outer case (not shown) may be provided outside the sliding structure 66, and the outer case (not shown) is fixedly coupled to the main board 63 and an opening is provided at a top of the outer case for the bearing belt 7 to pass therethrough.

Figure 7A:
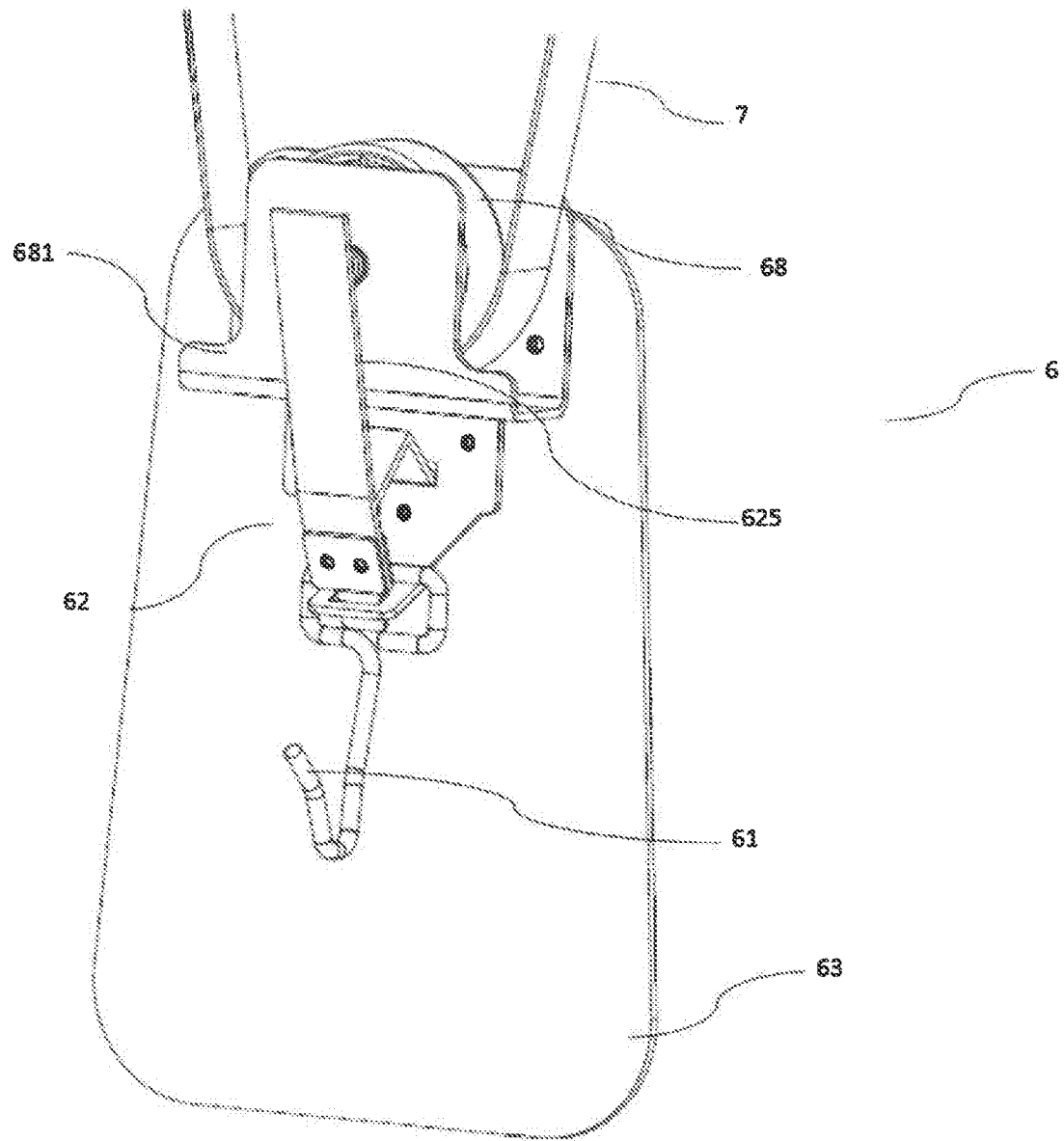
FIG. 7(a) is a perspective view of the guard in accordance with a second embodiment.
Figure 7B:
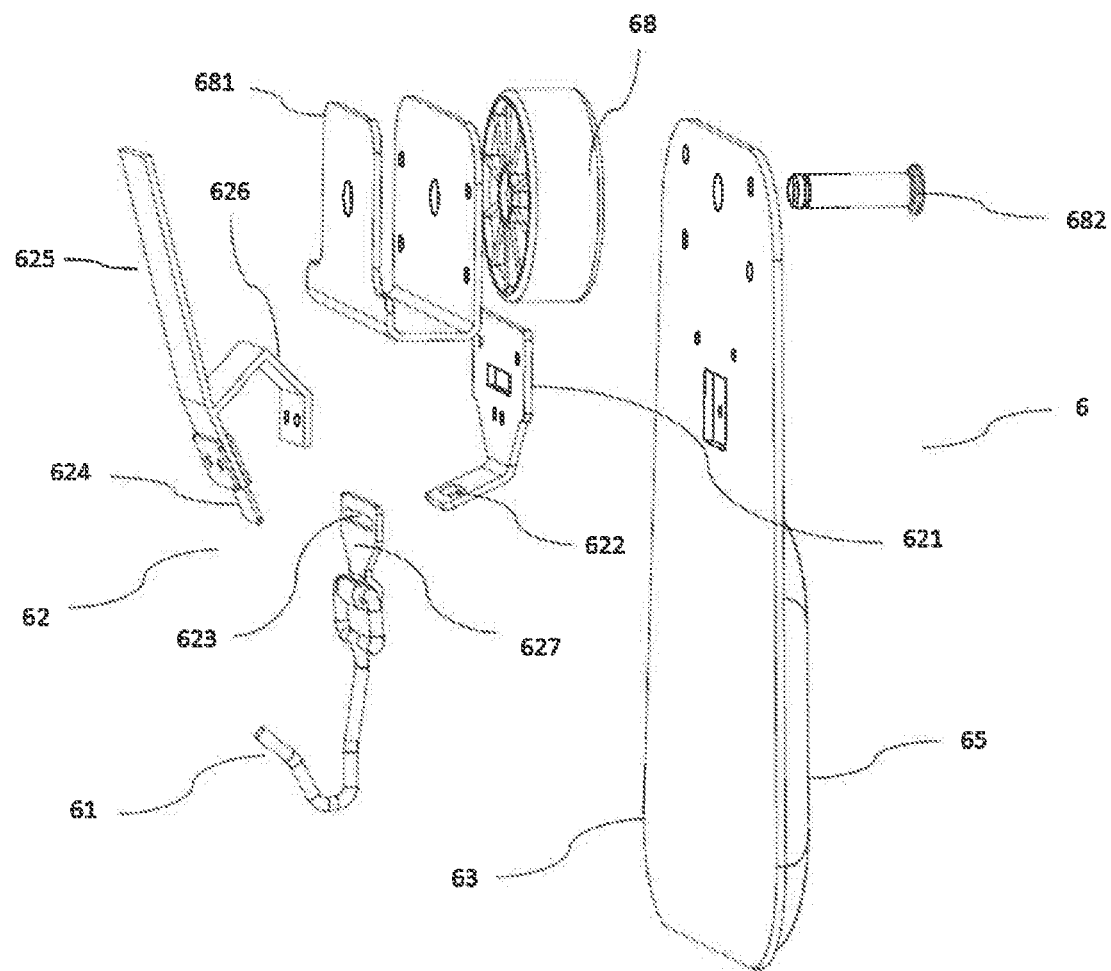
FIG. 7(b) is an exploded view of the guard in accordance with the second embodiment.

FIG. 7(a) and FIG. 7(b) show another guard in a second embodiment, the difference of the guard in the second embodiment with the guard in the first embodiment is a different sliding structure, other structures are substantially same. The sliding structure in the second embodiment is a support member 681 fixedly mounted on the upper portion of the guard 6, the support member 681 has a U-shape with a U-shaped groove, a rotating shaft 682 passes through a pulley 68 and inserts two holes defined on two opposite sidewalls of the U-shaped groove to pivotally assemble the pulley 68 within the U-shaped groove. The bearing belt 7 passes through a gap between the pulley 68 and the bottom wall of the support member 681. The gap can be regarded as a sliding hole defined in a plane which is perpendicular to the front-rear direction and running through along the front-rear direction, so that the guard 6 is slidable along the bearing belt 7 along the front-rear direction. Similar as the guard in the first embodiment, the top of the guard 6 connects with the waist belt 5 by the elastic band 10 to disperse the weight of the tool hung on the suspension structure 61. The tool can drive the guard 6 to slide along the bearing belt 7 in the front-rear direction, which improves the working comfort of the tool carrier 100.

Figure 8A:
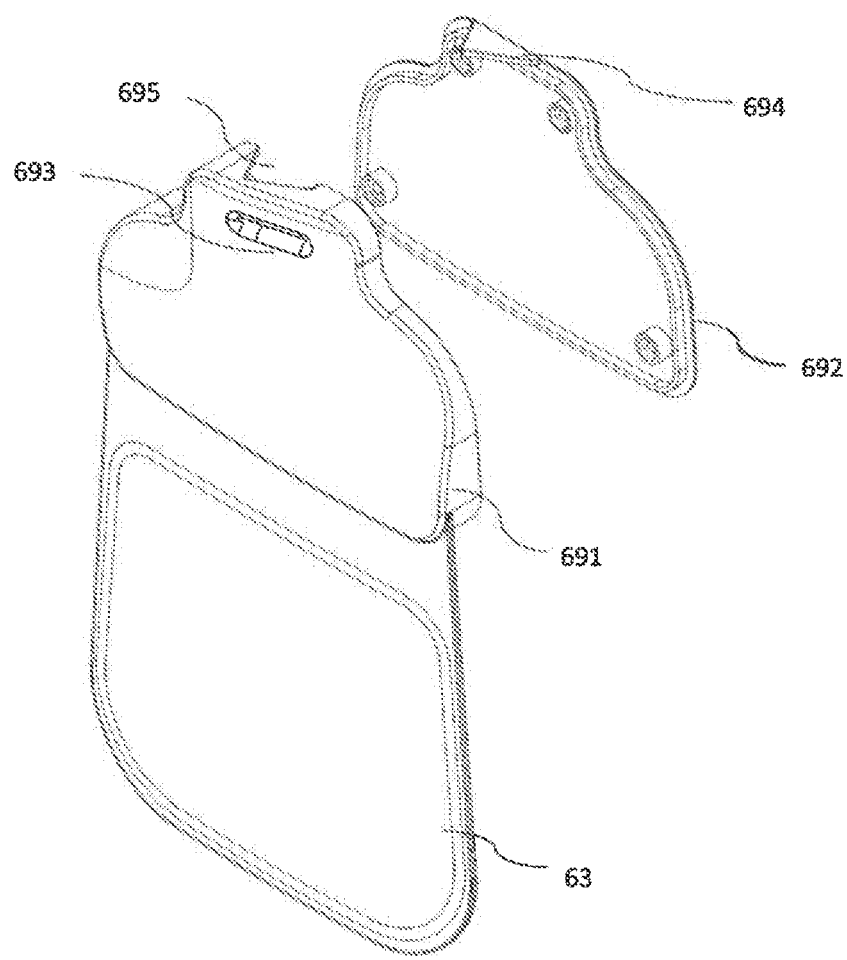
FIG. 8(a) is an exploded view of the guard in accordance with a third embodiment.
Figure 8B:
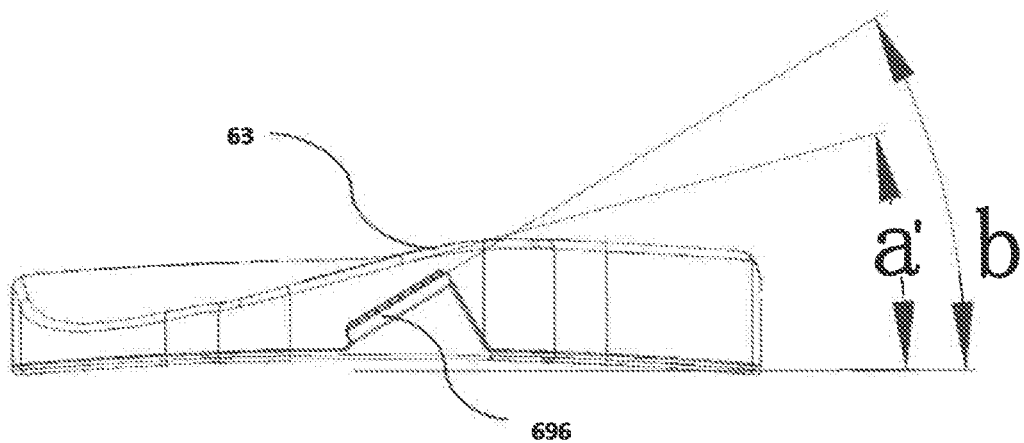
FIG. 8(b) is a top view of the guard in accordance with the third embodiment.

FIG. 8(*a*) and FIG. 8(*b*) shows another guard in a third embodiment, wherein the suspension structure 61 and the quick release member 62 are omitted for simple description. The difference of the guard in the third embodiment with the guard in the first embodiment is a different sliding structure, other structures are substantially same, and the guard is also attached to the waist belt 5 by the elastic band 10. The sliding structure 69 of the guard in the third embodiment is composed of an outer portion 691 and an inner portion 692, which are made of metal or plastic and fixed to the main board 63 by riveting, bolting or welding. The outer portion 691 defines an opening 693 on an lateral side thereof and defines an upper through hole 696 together with the inner portion 692 on a top thereof, the bearing belt 7 pass the opening 693 and the upper through hole 696 so that the guard 6 can slide along the bearing belt 7. The upper through hole 696 is defined between a recess 695 and a protrusion 694, the recess 695 is provided at the top of the outer portion 691, the protrusion 694 is provided at the top of the inner portion 692, when the outer portion 691 and the inner portion 692 are assembled, the protrusion 694 inserts into the recess 695 and define the upper through hole 696 with the recess 695.

Conjoined with FIG. 8(*b*), a top of the outer portion 691 of the sliding structure 69 is disposed at an angle a' with the main plane of the main board 63, and the angle a' is defined as an acute angle which is specifically 0-90°, preferably 0-60°. When the top of the outer portion 691 and the main plane of the main board 63 are perpendicular to each other, the angle a' is 90 degrees. Observe from a top side, in order to ensure that the bearing belt 7 can slide freely, the upper through hole 696 is disposed at an angle b with the main board 63, and the angle b is 0-90°, preferably 0-60°, and more preferably 25-35°. When the upper through hole 696 is perpendicular to the main board 63, the angle b is 90 degrees. That is, the angle b is formed between the horizontal projection of the upper through hole 696 (which may also be regarded as a sliding hole) and the horizontal projection of the main plane of the main board 63.

Figure 9:
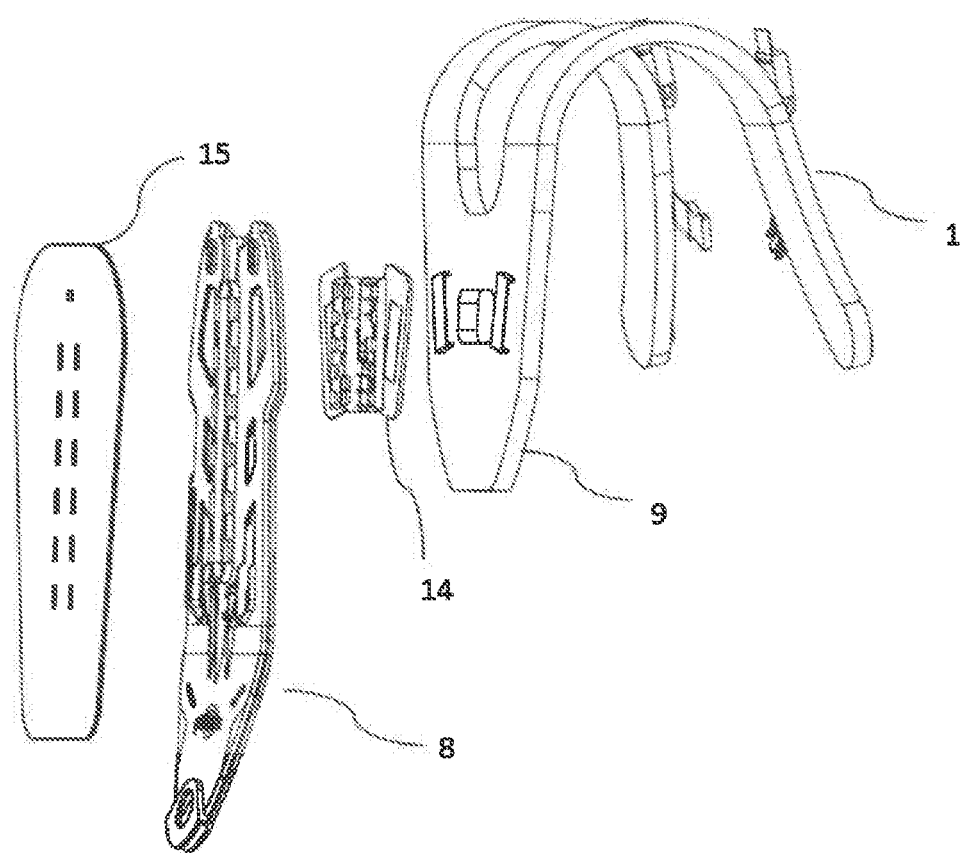
FIG. 9 shows a part of the tool carrier in the back side.

FIG. 9 is an exploded view of the back structure of the tool carrier 100, a height adjustor 14 is disposed between the backplane 8 and the pad 9, the height adjustor 14 can bring the backplane 8 to upwardly and downwardly move relative to the pad 9 according to different heights of operators, the bearing plane 15 which is used to bear load such as the battery pack, is mounted to the backplane 8.

Figure 10:
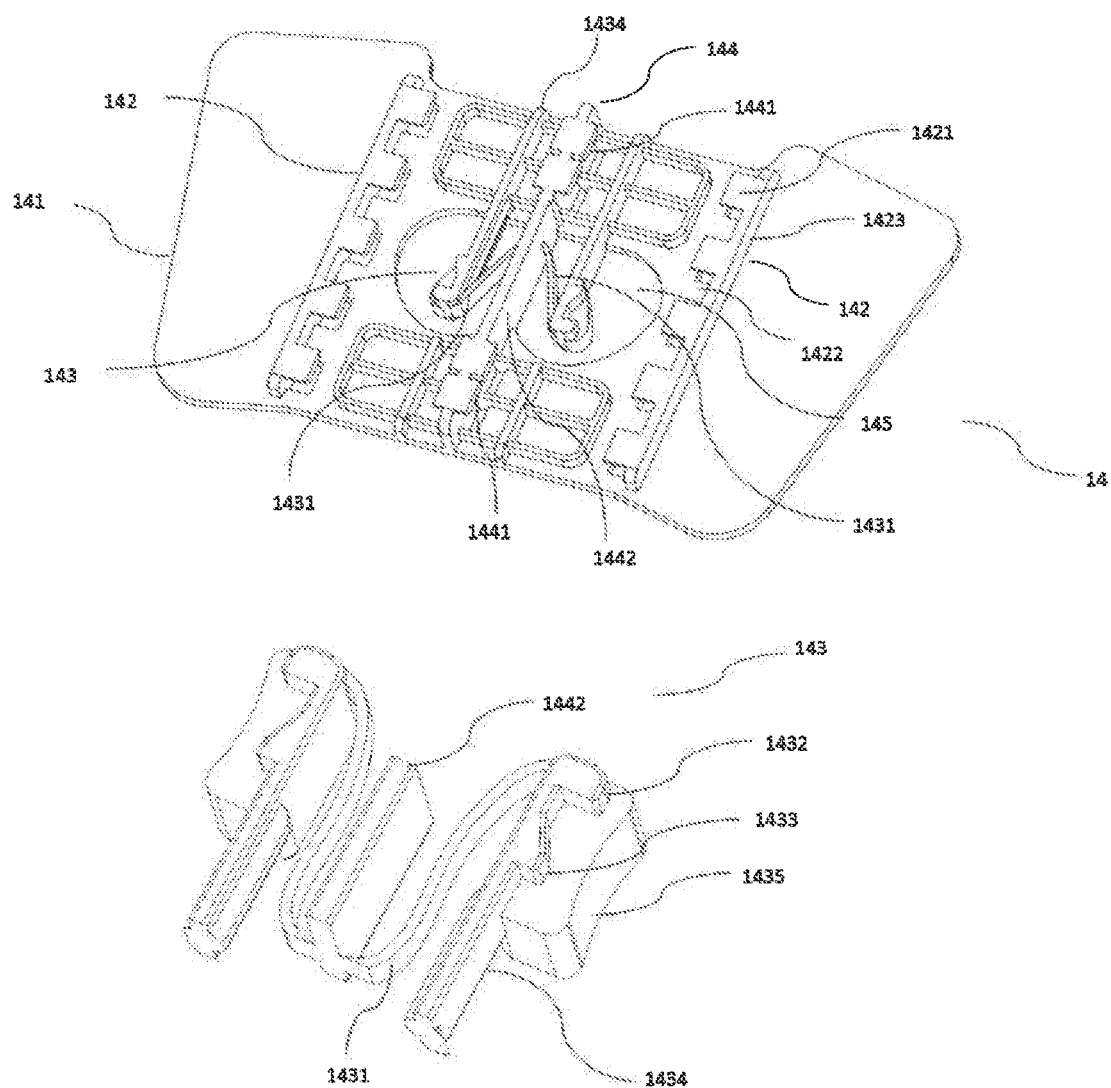
FIG. 10 is a perspective view of a height adjustor of the tool carrier.

As shown in FIG. 10, the height adjustor 14 is connected to the pad 9 by the height adjusting bottom plate 141, which is fixedly connected to the pad 9 by riveting, bolting, welding, etc. As a preferred embodiment, the height adjustor 14 is connected with the pad 9 by a rotatable member, so when the operator works with load, the movable connection between the height adjustor 14 and the pad 9 can make a movement of the operator's shoulder relative to the operator's waist smoother, to improve the comfort of the entire system. The height adjustor 14 is disposed bilaterally symmetrically with respect to a fixed rail 144, and the fixing rail 144 comprises a supporting portion 1442 disposed perpendicular to the height adjusting bottom plate 141 and an anti-off part 1441 parallel to the height adjusting bottom plate 141 and connected to the height adjusting bottom plate 141 via the supporting portion 1442. The height adjustor 14 is symmetrically provided with an adjusting rail 142, which is composed of a rail top wall 1421, a side wall 1423 and the height adjusting bottom plate 141.

Moreover, the height adjustor 14 has a first adjusting portion 143 symmetrically disposed with respect to the fixing rail 144, the bottom plate 141 defines an adjusting hole 145 corresponding to the first adjusting portion 143, the operator pass through the adjusting hole 145 by fingers to adjust the first adjustment portion 143. The first adjusting portion 143 is connected to the height adjusting bottom plate 141 by a connecting member 1434 and connected to the supporting portion 1442 by an elastic supporting member 1431 which is an elastic member in an arc shape and is made by metal or plastic. The first adjusting portion 143 is further provided with a first locking portion 1432 and a second locking portion 1433 for locking with backplane protrusions 82 formed on the backplane 8. Each of the first engaging portion 1432 and the second engaging portion 1433 has a pressing portion 1435, operator can press the pressing portion 1435 toward the fixed rail 144, and the elastic support 1431 is elastically deformed to allow the pressing portion 1435 to movable inwardly.

FIG. 11(*a*) and FIG. 11(*b*) are schematic views of an inner side and an outer side of the backplane 8, respectively, the inner side of the backplane 8 is symmetrically disposed with respect to a backplane groove 81, the backplane groove 81 is composed of a backplane recess 811 at an upper portion of the backplane 8 and a slot 812 upwardly communicating with the backplane recess 811. The backplane recess 811 is a recessed portion but does not penetrate the backplane 8, while the slot 812 is a through slot and penetrates the backplane 8. A blocking portion 86 is disposed under the slot 812 to stop the supporting portion 1442 of the height adjustor 14 during an adjusting process and prevented the height adjustor 14 from falling from the backplane 8. In one embodiment, the blocking member 86 is an arc-shaped projection symmetrical with respect to the backplane groove 81, as an alternative manner, the blocking member 86 may also be a convex of a square shape or a rectangular shape. The backplane 8 is provided with a backplane guide 83 symmetrical with respect to the backplane groove 81 and a plurality of symmetrical backplane protrusions 82. In another embodiment, the backing plate projections 82 are rectangular or square projections.

In assembly, the fixing rail 144 of the height adjustor 14 is inserted into the backplane recess 811 at the upper portion of the backplane groove 81 inside the backplane 8, while press the pressing portion 1435 with fingers and downwardly slide the height adjustor 14 along backplane recess 811. Then, the backplane guide 83 of the backplane 8 is inserted into the adjusting rail 142 of the height adjustor 14, and slides upwardly and downwardly along the adjusting rail 142 in a vertical direction. When the backplane 8 arrives a proper position, the pressing portion 1435 is released and restores by its elastic force, accordingly, the first locking portion 1432 and the second locking portion 1433 of the first adjusting portion 143 move to lock with the backplane protrusion 82 of the backplane 8, respectively, to fix the backplane 8 in a proper position and restrict a movement of the backplane 8 along the vertical direction at the same time, so that the connection between the backplane 8 and the height adjustor 14 is made stronger.

In present embodiment, the first adjusting portion 143 is provided with the first locking portion 1432 and the second locking portion 1433, as a simple modify, the first adjusting portion 143 can only be provided with one locking portion, appropriately increasing the number of the locking portion can reduce the weight forced on each of the locking portion, thereby increasing the reliability of the engagement, and preventing the breakage of the locking portion. The rail top wall 1421 of the adjustment rail 142 may be a continuous plate-like structure, in a preferred embodiment, the rail top wall 1421 of the adjustment rail 142 is provided with a plurality of uniform or non-uniformly spaced recesses 1422, which can reduce friction force between the adjustment rail 142 and the backplane guide 83 during assembly and adjustment process to make the sliding smoother. Similarly, the backplane guide 83 of the backplane 8 is provided with a plurality of recessed portions, thereby further reducing the frictional force between the adjustment rail 142 and the backplane guide 83 during assembly and adjustment process, to facilitate adjustment and assembly.

Figure 11A:
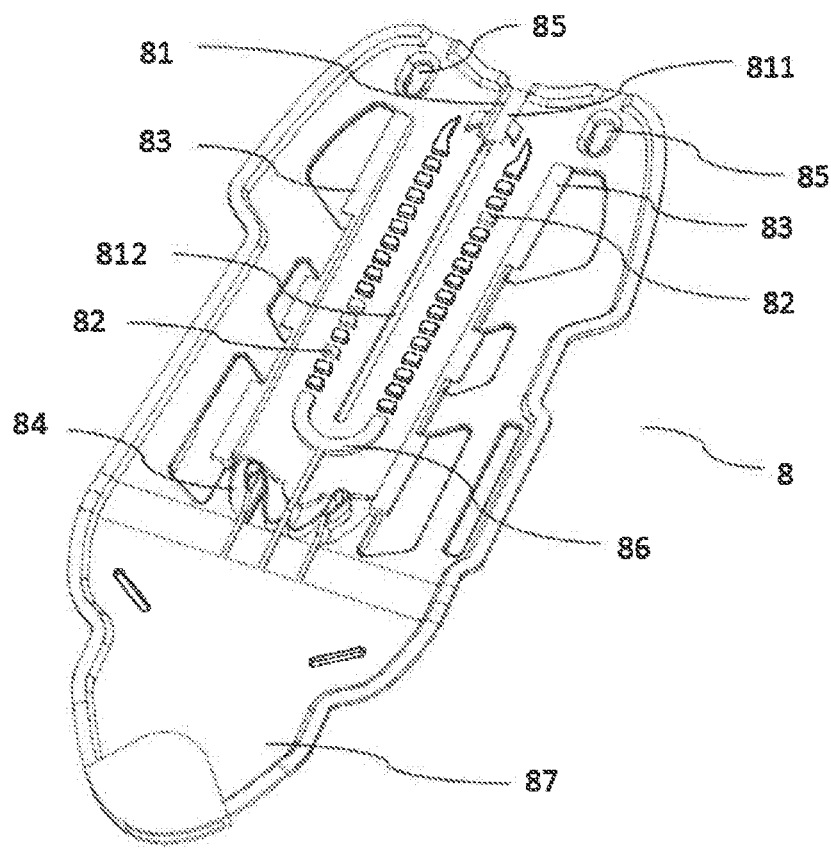
FIG. 11(a) is a perspective view of a backplane of the tool carrier.
Figure 11B:
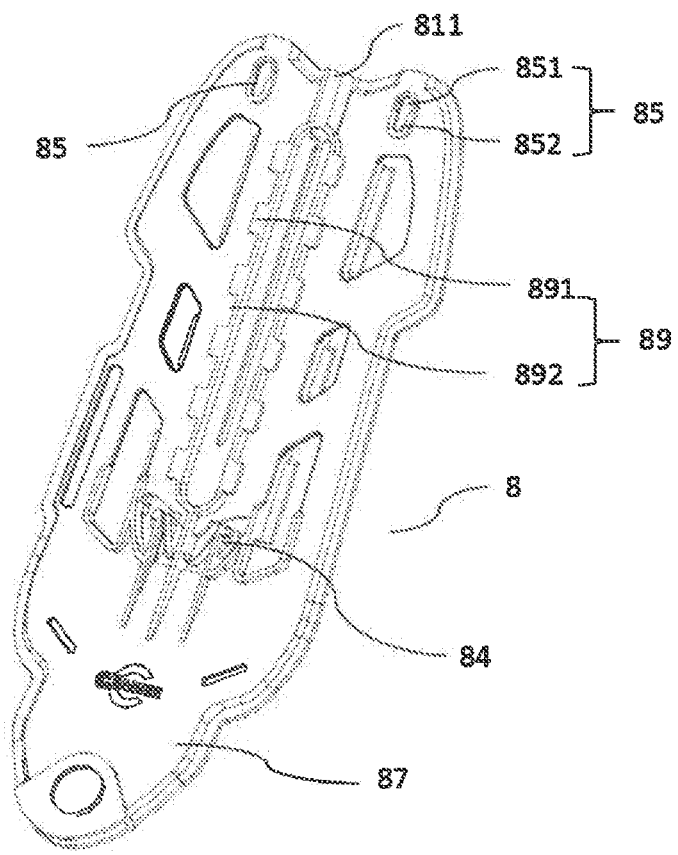
FIG. 11(b) is another perspective view of the backplane.
Figure 11C:
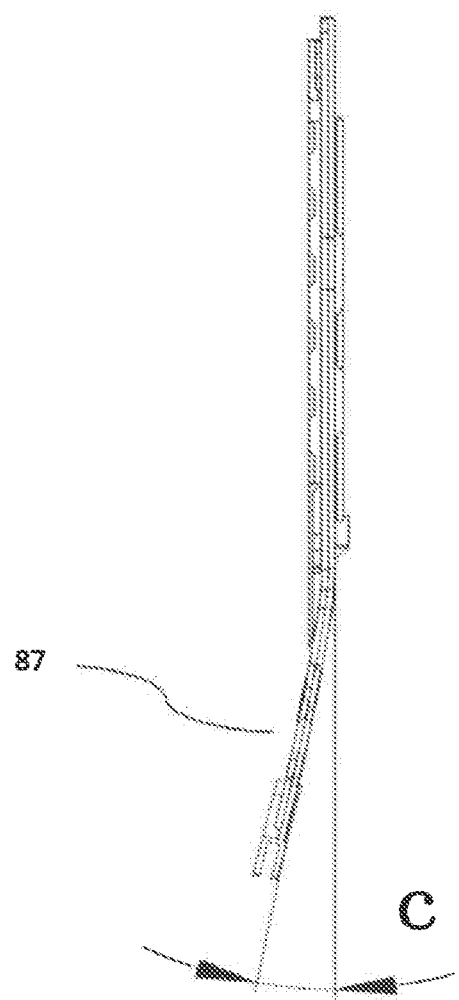
FIG. 11(c) is a side view of the backplane.
Figure 11D:
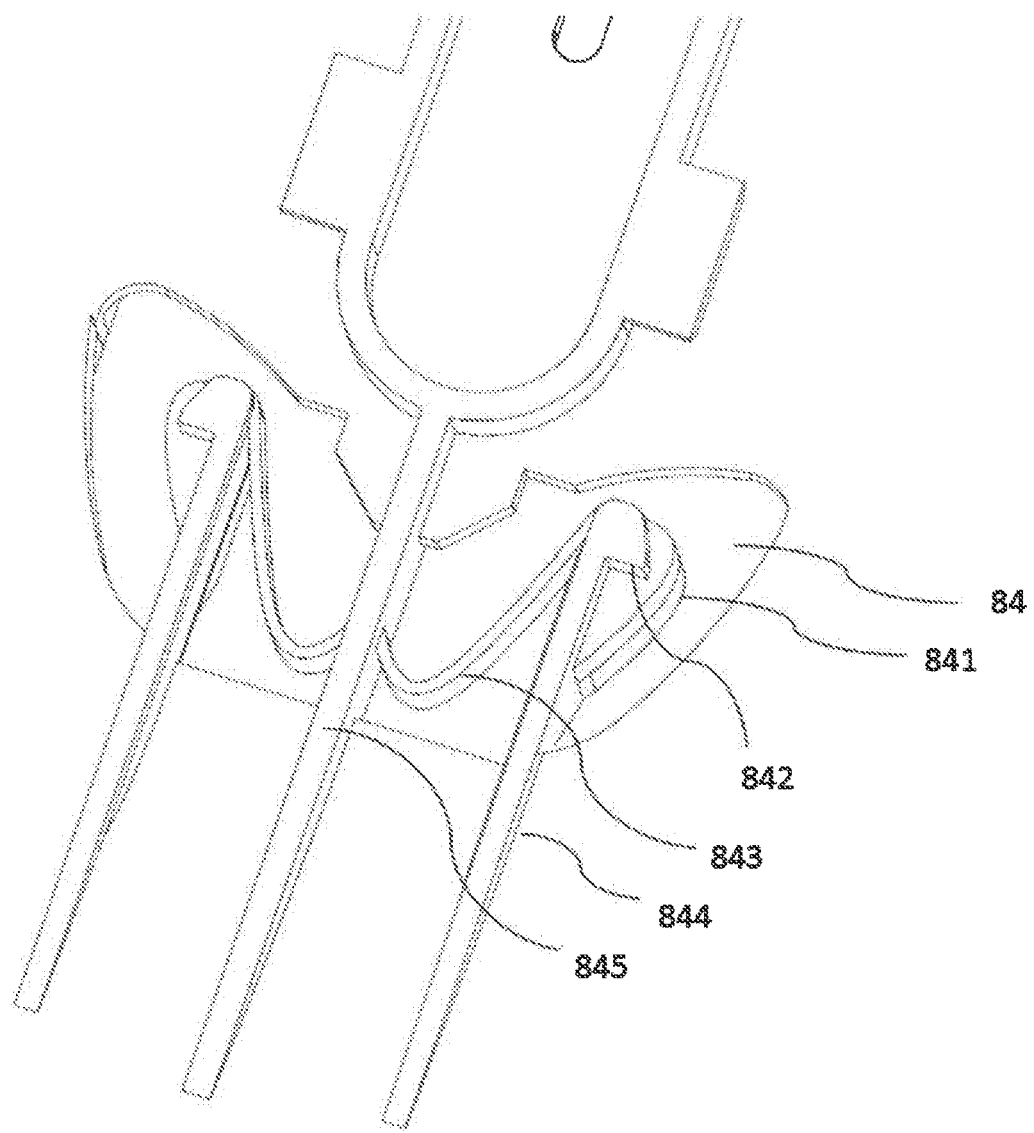
FIG. 11(d) is a perspective view of an adjusting portion of the backplane.

Generally, the backplane 8 is substantially upright, as a preferred embodiment, as shown in FIG. 11(c), an upper portion of the backplane 8 and a connecting portion 87 at a bottom portion of the backplane 8 are disposed at a certain angle c therebetween. In this way, the backplane 8 can fit the back and the waist of the operator better, the angle c is specifically 0-45°, preferably 0-30°, and more preferably 0°-15°.

FIG. 11(c) is a schematic view of a second adjusting portion 84. The second adjusting portion 84 has a substantial same structure as the first adjusting portion 143, and has a pressing portion 841 for the user to press, an engaging portion 842 and an elastic support 843 elastically connect with the intermediate connecting member 845, and the intermediate connecting member 845 is joined with the blocking member 86 at an upper portion thereof, and joined with the backplane 8 at a lower portion thereof.

Figure 12:
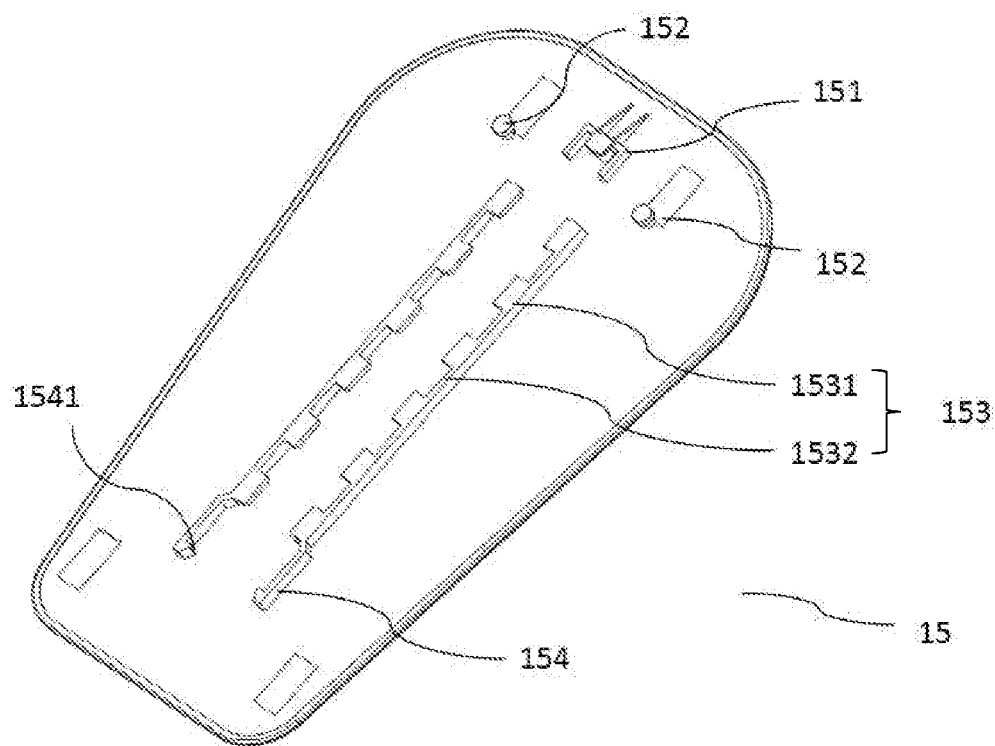
FIG. 12 is a perspective view of a bearing plane of tool carrier.

FIG. 12 is a schematic view of the bearing plane 15, the bearing plane 15 is provided with two symmetrical load-bearing columns 152 at a top thereof, the load-bearing column 152 is composed of an upper and a lower cylinders, the diameter of the upper cylinder is larger than the diameter of the lower cylinder, and the load-bearing column 152 can inserts into a load-bearing hole 85 defined at the top of the outer side of the backplane 8. The load-bearing hole 85 includes a first bearing hole 851 and a second bearing hole 852, which has a smaller size than that of the first bearing hole 852. Two rows of second ridges 153 are symmetrically disposed on the bearing plane 15, and the second ridges 153 include at least one ridge protrusion 1531 and at least one ridge recesses 1532 uniformly distributed along the insertion direction.

A load-bearing engaging portion 154 is disposed at below the second ridge 153 and has a projection 1541 disposed perpendicular to the insertion direction. In assembly, the load-bearing column 152 is inserted into the load-bearing hole 85, and then the bearing plane 15 is pushed downwardly or the bearing plane 15 moves downward by gravity from a first load-bearing hole 851 of the load-bearing hole 85 to a second load-bearing hole 852. When the load bearing column 152 is located within the first bearing hole 851, a convex portion 891 of a first ridge 89 on the outer side of the backplane 8 is inserted into the bearing recess 1532 of the second ridges 153; when the bearing plane 15 slides to the second bearing hole 852, a convex portion 891 of the first ridge 89 of the backplane 8 coincides with the ridge protrusion 1531 along a front-to-back direction, at that time, a load-bearing engaging portion 154 at a bottom of the second ridges 153 automatically locks with the engaging portion 842 of the second adjusting portion 84 on the backplane 8. Such arrangement can prevent the load from falling off due to bending or the like of the operator during the operation.

Furthermore, the top of the bearing plane 15 has a load-bearing blocking portion 151. If the load-bearing column 152 is damaged or broken, the load-bearing blocking portion 151 can engages with the backplane recess 811 of the backplane 8, thereby preventing the bearing plane 15 from sliding further downwardly so as to increase the reliability of the connection.

When need to unload the bearing plane 15, press the pressing portion 841 of the second adjusting portion 84, the engaging portion 842 of the second adjusting portion 84 is disengaged from the projection 1541 of the load-bearing engaging portion 154 of the bearing plane 15, and then lift the bearing plane 15 and bring the load-bearing column 152 to slide from the second bearing hole 852 to the first bearing hole 851, and finally pull the bearing plane 15 outwardly to unload the bearing plane 15. The bearing plane 15 is connected to the load by stitching, bolting, welding, etc., and may also be integrally provided with the load, for example, when the load is a battery pack, the bearing plane 15 may be integrally disposed with the battery pack.

Figure 13:
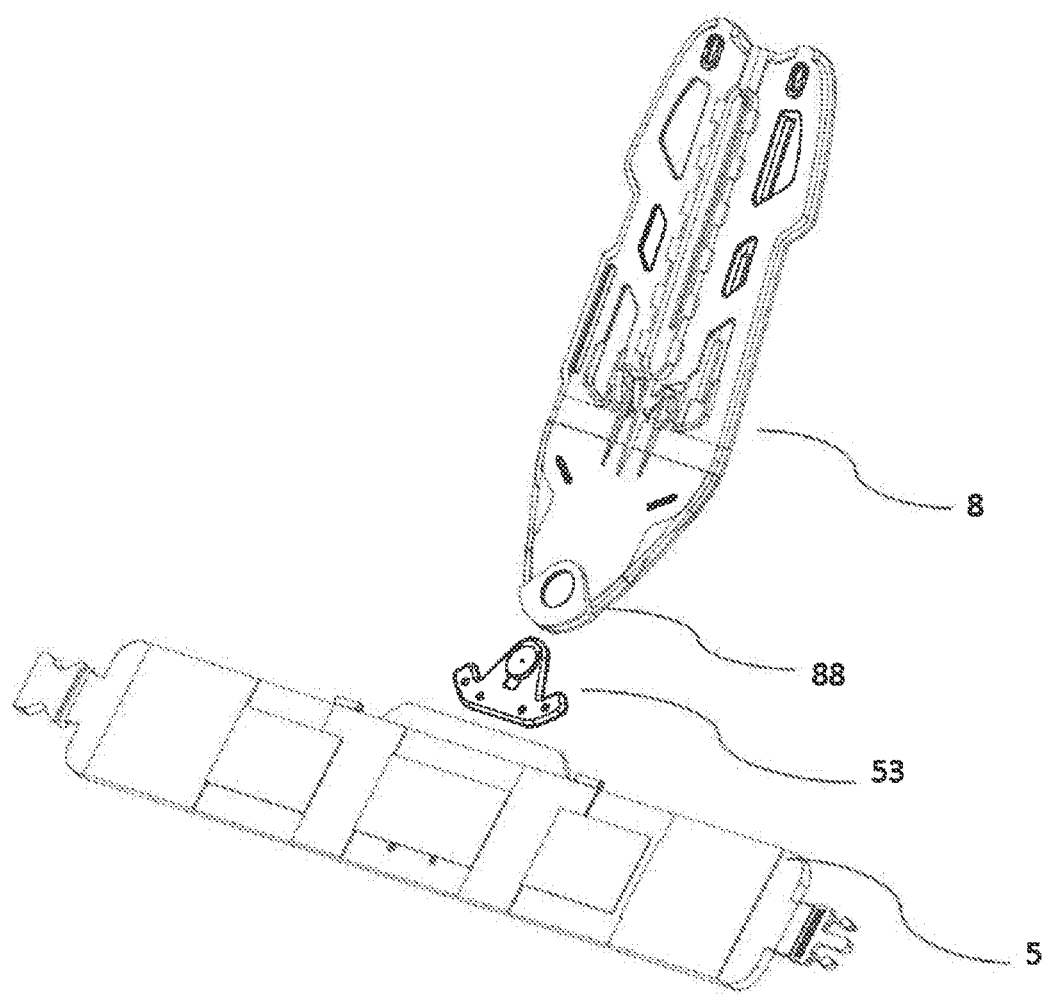
FIG. 13 shows the waist belt connecting with the backplane.
Figure 14A:
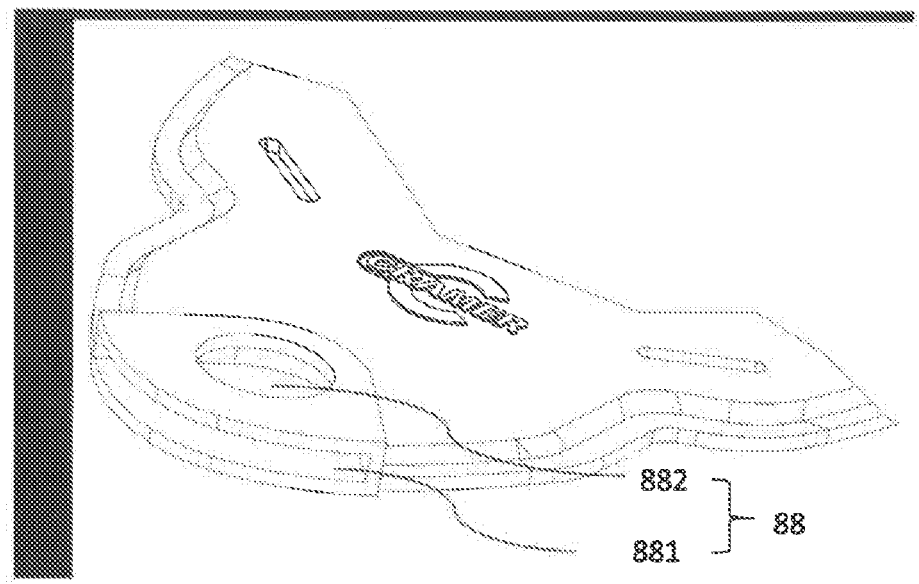
FIGS. 14(a)-14(d) show a connecting member connecting the waist belt with the backplane.
Figure 14B:
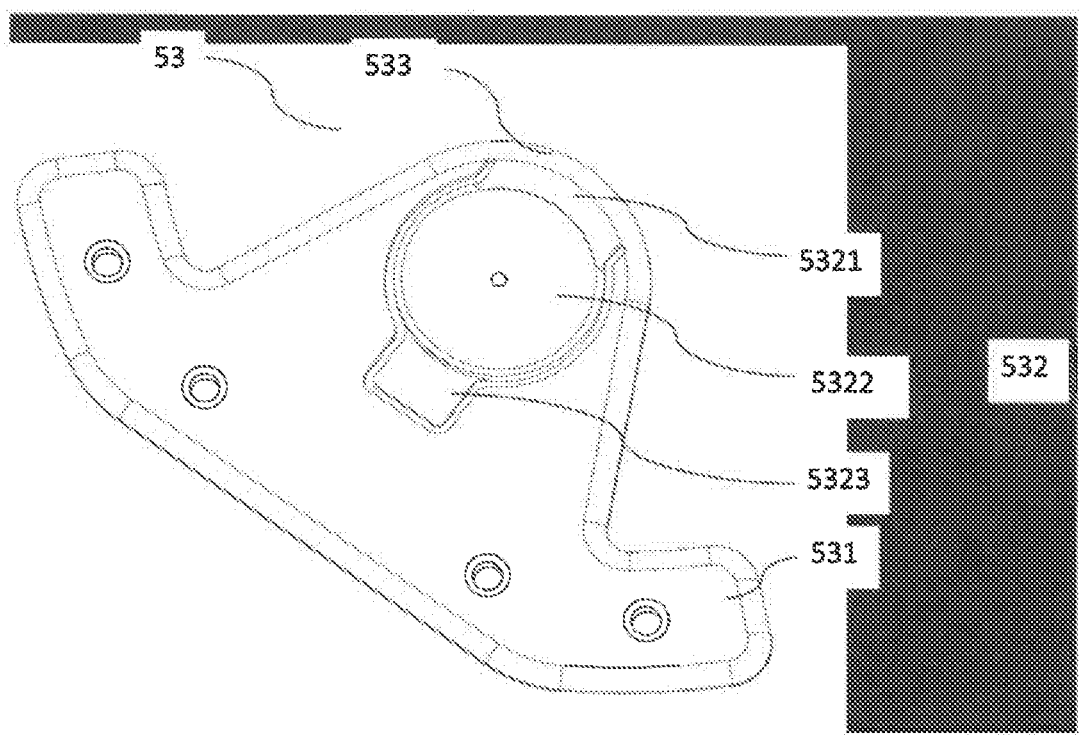
Figure 14C:
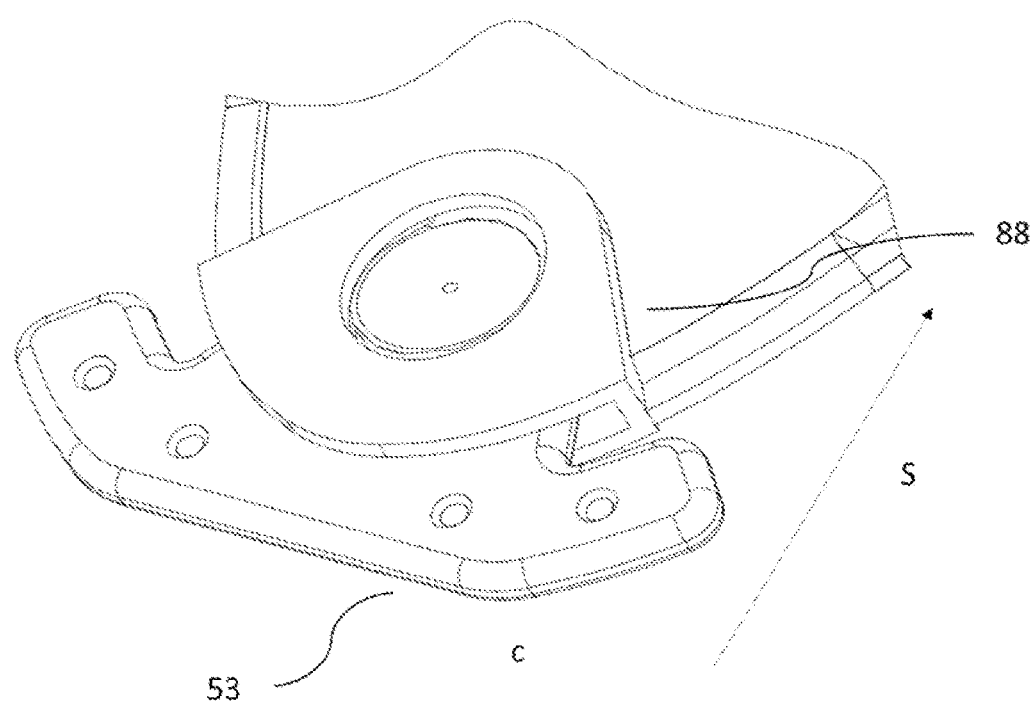
Figure 14D:
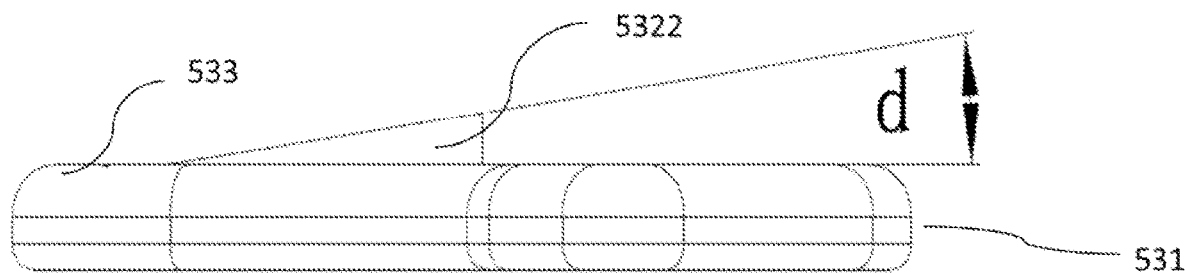
Figure 15A:
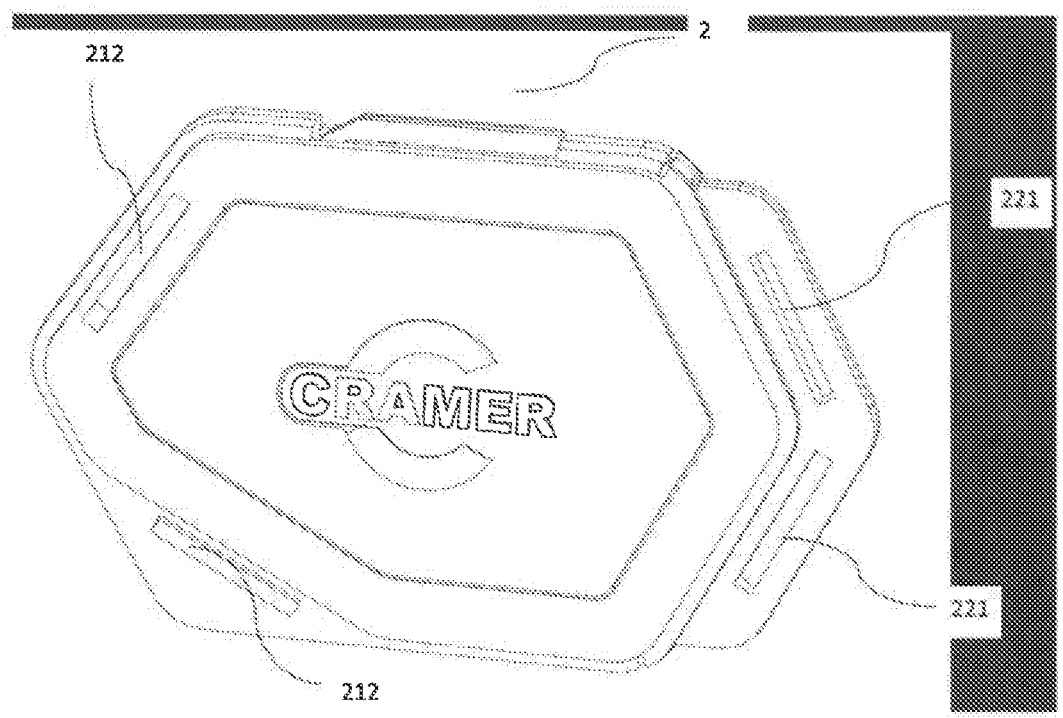
FIGS. 15(a)-15(d) show a chest buckle of the tool carrier.
Figure 15B:
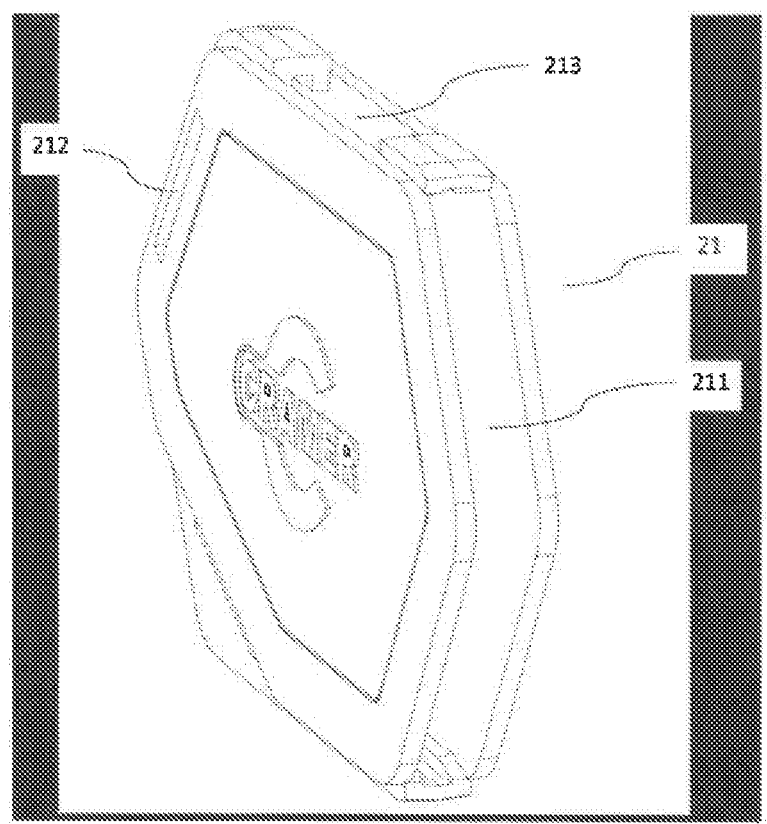
Figure 15C:
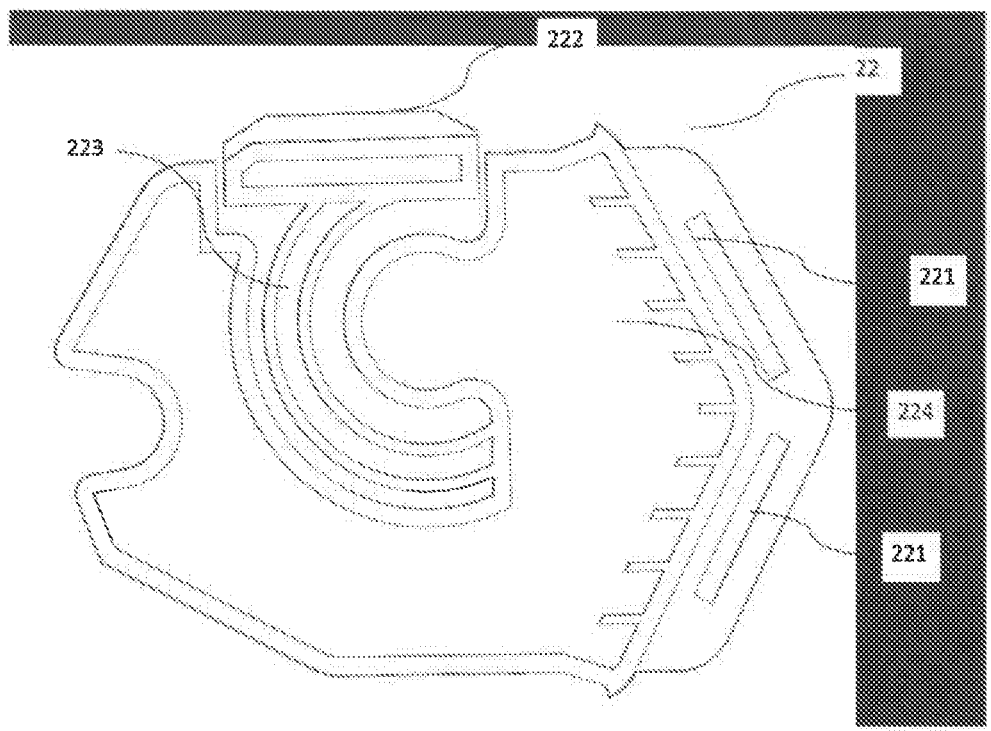
Figure 15D:
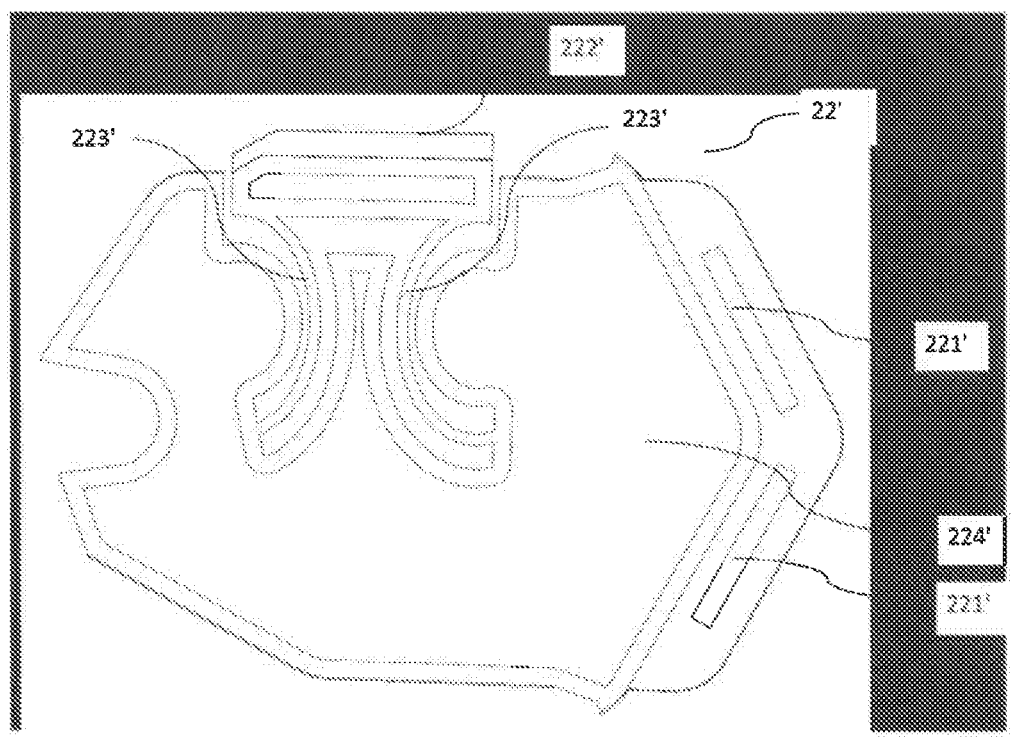

FIG. 13 is an exploded view showing the connection structure of the waist belt 5 and the backplane 8, only the connection structure is shown, and other components are omitted. Conjoined with FIG. 14(a) to FIG. (d), the waist belt 5 and the backplane 8 are connected by a belt connecting portion 53, which has a connecting body 531 connected to the waist belt 5 by sewing, riveting or bolting. The backplane 8 has a backplane engaging portion 88 disposed on a bottom thereof and provided with an inserting opening 881 and a rotating hole 882. The belt connecting portion 53 has a locking portion 532, the locking portion 532 has a circular rotating portion 5322 disposed at an angle to the connecting body 531. The rotating portion 5322 is connected to a front portion 533 of the belt connecting portion 53 via a rotating connecting portion 5321, which substantially has a same shape as the inserting opening 881. The locking portion 532 has a pressing portion 5323 opposite to the rotating connecting portion 5321, when the belt connecting portion 53 is inserted into the backplane engaging portion 88 along S direction as shown in FIG. 14(c), as the belt connecting portion 53 gradually inserts, the rotating portion 5322 is gradually deformed as being pressed by a top wall of the insertion opening 881, and an angle d between the rotating portion 5322 and the connecting body 531 is gradually decreased. After the rotating portion 5322 is completely inserted into the rotating hole 882, the rotating portion 5322 resets by its elastic force, thereby fixing the rotating portion 5322 in the rotating hole 882. In order to flexibly rotate the rotating portion 5322 with respect to the backplane 8, a diameter of the rotating portion 5322 is slightly smaller than the inner diameter of the rotating hole 882.

When detach the waist belt 5 from the backplane 8, press the pressing portion 5323, and the pressing portion 5323 is moved inwardly to bring the rotating portion 5322 away from the rotating hole 882, finally pull the waist belt 5 downwardly, the waist belt 5 is detached from the backplane 8.

In above embodiment, since the rotating portion 5322 is disposed at an angle to the connecting body 531, the rotating connecting portion 5321 provides an elastic force for the rotating portion 5322, in another embodiment, the rotating portion 5322 can be horizontally disposed, and elastic parts, such as springs and elastic piece, are installed under the rotating portion 5322 to provide elastic force. During insertion of the waist belt 5, press the pressing portion 5323 by hand, the top portion 533 of the belt connecting portion 53 is inserted into the opening 881; then release the pressing portion 532, and the rotating portion 5322 is reset by the elastic force to engage with the rotating hole 882. It will be appreciated by those skilled in the art that, a blocking member is necessarily provided between the rotating portion 5322 and the connecting body 531 to prevent the rotating portion 5323 completely departed from the connecting body 531 under the action of the elastic force.

The waist belt 5 is rotatably coupled with respect to the backplane 8, the operator is allowed to be more flexible in working to be more comfortable.

FIG. 15(*a*) to FIG. 15(*d*) is a schematic structural view of the chest buckle 2, and the chest buckle 2 is formed by a female buckle 21 and a male buckle 22. Conjoined with FIG. 1, the chest buckle 2 is substantially six sides, and is oppositely disposed with two male buckle strap ends 221 and two female buckle strap ends 212 on a right side and a left side thereof. The two male buckle strap ends 221 are oppositely disposed on the left side of the male buckle 22, the two female buckle strap end 212 are oppositely disposed on the right side of the female buckle 21. Each of the male buckle strap end 221 and the female buckle strap end 212 is connected to one end of a quick-connect device, respectively, and the other ends of the quick-connect devices are connected with the male part 11 of the left and the right shoulder straps 1, the female part 12 of the strap 1, the bearing belt 7 and the side strap 3, respectively, specifically, the female buckle strap end 212 on a lower right end of the chest buckle 2 is detachably connected with the bearing belt 7, and the male buckle strap end 221 on the lower left end of the chest buckle 2 is detachably connected with the side strap 3, and the male buckle strap end 221 on the upper left end of the chest buckle 2 and the female insertion strap end 212 on the upper right end of the chest buckle 2 both are detachably connected the a left and a right shoulder straps 1, respectively. Such arrangement allows the chest buckle 2 to be completely disengaged from the harness system, and the tool carrier 100 can be quickly disengaged to help operator to escape in the event of an emergency.

Referring to FIG. 15(*b*), the female buckle 21 is provided with a female buckle opening 213 on an upper portion thereof, and the female buckle 21 is provided a female buckle slot 211 on a side surface thereof. As shown in FIG. 15(*c*), the male buckle 22 is provided with a male buckle pressing portion 222 on an upper portion thereof, the male buckle pressing portion 222 is connected to an elastic connecting portion 223 which is an arc-shaped member. When assembly, the male buckle 22 is pushed into the female buckle 21 from the female buckle slot 211, during this pushing process, the male buckle pressing portion 222 is pressed by a top wall of the female buckle 21, due to a function of the elastic connecting portion 223, the male buckle pressing portion 222 moves downwardly to bring the male buckle 22 to move inwardly. After the male buckle 22 completely enters into the female button 21, the male buckle pressing portion 222 loses the restriction and resets by the function of the elastic connecting portion 223, then the buckle pressing portion 222 engages with the female buckle opening 213 to connect the male buckle 22 and the female buckle 21.

When depart the female buckle 22 and the male buckle 21, downwardly press the male buckle pressing portion 222 of the female buckle 22 by hand to leave the female buckle opening 213, then pull the male buckle 22 outwardly to leave the female buckle 21.

FIG. 15(*d*) shows a male buckle 22' in another embodiment. A difference between the male insert 22' and the male insert 22 in that the elastic connecting portions 223' of the male insert 22' are two symmetrical arc-shaped members. When a male insertion pressing portion 222' is pressed, the two elastic connecting portions 223' are elastically deformed and bring the male insertion pressing portion 222' to downwardly move.

The chest buckle 2 is generally made by hard material, preferably plastic, the elastic connecting portion 223 (223') is generally made of plastic or metal and is a solid structure or a hollow structure. The structure of the elastic connecting portion 223 (223') is not limited to the above two embodiments, and any structure that causes the male buckle pressing portion 222 (222') to move in the vertical direction after being forced by an external force is within the protection scope of the patent. For example, put a spring or other resilient compressible resettable member under the male buckle pressing portion 222 (222'), the male buckle pressing portion 222 (222') moves downwardly when being forced by an external force, and reset to engage with the female buckle 21 after the external force is withdrawn.

In addition, it will be apparent to those skilled in the art that the belts referred to in the present invention refer to the flat-shaped elongated members of the prior art, and all of the belt-like members can be replaced with the prior art ropes, and all components in the technology that enable quick-connect function are within the protection range of the above-mentioned quick-connect device, and the quick-connect device has a length adjustment device that can adjust the length of the quick connect device to make two parts of the quick-connect device are tightened or loosened.

Although, the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Furthermore, although individually listed, a plurality of means or elements may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc., do not preclude a plurality. Reference signs in the claims are provided merely as a clarifying example and shall not be construed as limiting the scope of the claims in any way.

We claim:

1. A tool carrier, comprising:
  a harness system having at least one shoulder strap, and a waist belt;
  a guard provided with a main board, a sliding structure at a top of the main board, and a suspension structure at a bottom of the main board, the main board formed with a main plane, the sliding structure having an inner side facing an operator and an outer side facing away from the operator and defining a sliding hole extending from an opening in the outer side of the sliding structure to an upper through hole in a top of the sliding structure, and the sliding structure having an outer portion and an inner portion, the outer portion and the inner portion forming the sliding hole; and a bearing belt passing through the sliding hole of the guard and being connected to the harness system by two opposite ends thereof; wherein a horizontal projection of the sliding hole and a horizontal projection of the main plane define an angle therebetween, and the angle is an acute angle.

2. The tool carrier according to claim 1, wherein the angle is between 0°-60°.

3. The tool carrier according to claim 1, wherein the angle is between 25°-35°.

4. The tool carrier according to claim 1, wherein the sliding structure is disposed at an angle with respect to the main plane of the main board.

5. The tool carrier according to claim 1, wherein the sliding structure is fixed to the top of the main board, the top of the sliding structure is twisted disposed relative to the main plane to define an angle between the top of the sliding structure and the main plane, the sliding structure has a piece shape, and the sliding hole is defined at the top of the sliding structure.

6. The tool carrier according to claim 1, wherein a cushion pad is disposed on a side of the guard facing the operator.

7. The tool carrier according to claim 1, wherein a quick release member is fixed to the guard and makes the suspension structure able to quickly escape from the guard.

8. The tool carrier according to claim 1, wherein the guard and the waist belt are connected by an elastic band.

9. A tool carrier, comprising:
a harness system having at least one shoulder strap and a waist belt;
a guard having an inner side facing an operator and an outer side facing away from the operator, and provided with a sliding hole extending from an opening in the outer side to an upper through hole in a top of the guard, the sliding hole located at the top of the guard, the guard further including a suspension structure for hanging a tool;
an outer portion and an inner portion, the outer portion and the inner portion forming the sliding hole; and
a bearing belt passing through the sliding hole of the guard and having two opposite ends being connected to the harness system respectively, the bearing belt forming a bending line as engaging with the sliding hole, the bending line extending along the front to back direction but with an acute angle to the front to back direction as observed from a top side.

10. The tool carrier according to claim 9, wherein the acute angle is between 0°-60°.

11. The tool carrier according to claim 9, wherein the acute angle is between 25°-35°.

12. The tool carrier according to claim 9, wherein the harness system has two shoulder straps, a chest buckle connecting the two shoulder straps on a front side and a backplane connecting the two shoulder straps on a back side, wherein the two opposite ends of the bearing belt are connected to the backplane and the chest buckle, respectively.

13. The tool carrier according to claim 12, wherein the guard is provided with a main board, a sliding structure is disposed at a top of the main board and defines the sliding hole, the main board is formed with a main plane.

14. The tool carrier according to claim 13, wherein a top of the sliding structure defines the sliding hole and is twisted disposed relative to the main plane to define an acute angle between the top of the sliding structure and the main plane.

15. The tool carrier according to claim 13, wherein the guard defines an opening on a side surface thereof and an upper through hole on a top surface thereof, the bearing belt passes through both the opening and the upper through hole, and the upper through hole is disposed with an acute angle to the front to back direction.

16. The tool carrier according to claim 13, wherein a quick release member is fixed to the main board to make the suspension structure able to quickly escape from the guard.

* * * * *